(12) United States Patent
Sirota et al.

(10) Patent No.: US 8,055,586 B1
(45) Date of Patent: Nov. 8, 2011

(54) PROVIDING CONFIGURABLE USE BY APPLICATIONS OF SEQUENCES OF INVOCABLE SERVICES

(75) Inventors: Peter Sirota, Seattle, WA (US); Don Johnson, Seattle, WA (US); Gaurav D. Ghare, Seattle, WA (US); Aaron Mohrman, Seattle, WA (US); Tushar Jain, Seattle, WA (US); Eric M. Wagner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1176 days.

(21) Appl. No.: 11/618,486

(22) Filed: Dec. 29, 2006

(51) Int. Cl.
*G06F 21/00* (2006.01)

(52) U.S. Cl. ............ 705/52; 705/53; 709/217; 709/220; 709/229; 709/245; 719/328; 719/329; 719/330; 719/331; 719/332

(58) Field of Classification Search .............. 705/50–79; 709/217, 220, 229, 245; 719/328–332
See application file for complete search history.

(56) References Cited

U.S. PATENT DOCUMENTS

| | | | | |
|---|---|---|---|---|
| 5,826,244 | A | | 10/1998 | Huberman ....................... 705/37 |
| 5,958,016 | A | * | 9/1999 | Chang et al. .................. 709/229 |
| 6,078,906 | A | * | 6/2000 | Huberman ....................... 705/37 |
| 7,200,217 | B2 | * | 4/2007 | Breiholz et al. ......... 379/221.08 |
| 7,356,512 | B2 | * | 4/2008 | Okita et al. ....................... 705/51 |
| 7,370,075 | B2 | * | 5/2008 | Farquharson et al. ........ 709/203 |
| 7,447,642 | B2 | * | 11/2008 | Bodin ............................. 705/305 |
| 7,506,021 | B2 | * | 3/2009 | Polan et al. .................... 709/201 |
| 7,549,153 | B2 | * | 6/2009 | Butterworth et al. ......... 719/317 |
| 7,660,887 | B2 | * | 2/2010 | Reedy et al. ................... 709/224 |
| 7,689,430 | B2 | * | 3/2010 | Fremantle et al. ............. 705/1.1 |
| 7,711,832 | B1 | * | 5/2010 | Champion et al. ............ 709/228 |
| 7,729,955 | B2 | * | 6/2010 | Frederick et al. .......... 705/26.41 |
| 2001/0051929 | A1 | * | 12/2001 | Suzuki ............................ 705/52 |
| 2002/0048369 | A1 | * | 4/2002 | Ginter et al. .................. 380/277 |
| 2002/0120461 | A1 | * | 8/2002 | Kirkconnell-Ewing et al. . 705/1 |
| 2002/0120519 | A1 | * | 8/2002 | Martin et al. ................... 705/21 |
| 2002/0161676 | A1 | * | 10/2002 | Vadlamani ..................... 705/30 |
| 2003/0110242 | A1 | * | 6/2003 | Brown et al. ................. 709/222 |
| 2003/0187800 | A1 | * | 10/2003 | Moore et al. .................... 705/52 |
| 2003/0195813 | A1 | * | 10/2003 | Pallister et al. ................. 705/26 |

(Continued)

OTHER PUBLICATIONS

"Metering and Accounting for Web Services," IBM®, Jul. 2001, retrieved from http://www-106.ibm.com/developerworks/library/ws-maws/, 6 pages.

(Continued)

*Primary Examiner* — Mamon Obeid
(74) *Attorney, Agent, or Firm* — Seed IP Law Group PLLC

(57) ABSTRACT

Techniques are described for facilitating use of sequences of invocable services in a configurable manner, including by providing a metering service that tracks the use of invocable services by other invocable services or applications. In at least some situations, the invocable services are fee-based Web services or other fee-based network-accessible services, and are made available by providers of the services for use by others in exchange for fees defined by the service providers. The described techniques facilitate use of a sequence of such invocable services by applications in a manner configured by the creators of the applications and providers of the services, including to allow the application creators to define pricing terms that will be used to determine fees that end users of the applications will be charged for use of the invocable services via the applications.

46 Claims, 16 Drawing Sheets

U.S. PATENT DOCUMENTS

| | | | |
|---|---|---|---|
| 2004/0015448 A1* | 1/2004 | Asano | 705/52 |
| 2004/0073661 A1* | 4/2004 | Eibach et al. | 709/224 |
| 2004/0122926 A1* | 6/2004 | Moore et al. | 709/223 |
| 2004/0243583 A1* | 12/2004 | Olsen | 707/10 |
| 2005/0125389 A1* | 6/2005 | Hazzard et al. | 707/3 |
| 2005/0131773 A1* | 6/2005 | Daur et al. | 705/26 |
| 2005/0246726 A1* | 11/2005 | Labrou et al. | 719/328 |
| 2006/0015463 A1* | 1/2006 | Gupta et al. | 705/52 |
| 2006/0041641 A1* | 2/2006 | Breiter et al. | 709/219 |
| 2006/0080257 A1* | 4/2006 | Vaughan et al. | 705/51 |
| 2007/0050446 A1* | 3/2007 | Moore | 709/203 |
| 2007/0061266 A1* | 3/2007 | Moore et al. | 705/51 |
| 2007/0100886 A1* | 5/2007 | Steeb et al. | 707/104.1 |
| 2007/0289028 A1* | 12/2007 | Vaughan et al. | 726/30 |
| 2008/0040510 A1* | 2/2008 | Warner et al. | 709/246 |
| 2008/0086490 A1* | 4/2008 | Paliwal et al. | 707/101 |
| 2008/0086564 A1* | 4/2008 | Putman et al. | 709/227 |
| 2008/0109363 A1* | 5/2008 | Fassett | 705/52 |
| 2008/0154796 A1* | 6/2008 | Pallister et al. | 705/36 R |
| 2008/0249904 A1* | 10/2008 | Eibach et al. | 705/34 |
| 2009/0099940 A1* | 4/2009 | Frederick et al. | 705/26 |
| 2009/0276771 A1* | 11/2009 | Nickolov et al. | 717/177 |
| 2010/0251270 A1* | 9/2010 | Dale et al. | 719/328 |

OTHER PUBLICATIONS

"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.

"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release..., 4 pages.

"The Web Services Architect: Catalysts for Fee-Based Web Services," IBM®, Nov. 2001, retrieved from http://www-106.ibm.com/developerworks/library/ws-arc6/, 7 pages.

"Web Service Use Case," ContentGuard Holdings, Inc., retrieved Aug. 9, 2005, from http://www.contentguard.com/reference/docs/SimpleWebServiceExampleContent.htm, 4 pages.

"Web Service Use Case: Travel Reservation—Use Case May 5, 2002," W3C®, May 2002, retrieved Aug. 9, 2005, from http://www.w3.org/2002/06/ws-example, 9 pages.

"Web Services Architecture Usage Scenarios—W3C Working Draft Jul. 30, 2002," W3C®, Jul. 2002, retrieved Aug. 2, 2005, from http://www.w3.org/TR/2002/WD-ws-arch-scenarios-20020730/, 78 pages.

"Web Services Marketplace," retrieved Sep. 9, 2005, from http://web.archive.org/web/20010404230735/www/epicentric.com/solutions/mkt.jsp, 4 pages.

Actional™, The Web Services Management Platform: Managing the Impact of Change in an Enterprise Web Services Network—Mar. 2003, retrieved Nov. 7, 2003, from http://www.actional.com/downloads/products/managing.enterpriseweb.services.network.pdf 26 pages.

Actional™, Web Services Management Platform, retrieved Nov. 7, 2003, from http://www.actional.com/products/web_services/index.asp, 3 pages.

Albrecht, C., et al., "Marketplace and Technology Standards for B2B. Ecommerce: Progress and Challenges," MIS Quarterly Special Issue on Standard Making, International Conference on Information Systems, Dec. 2003, Seattle, WA, pp. 188-209, 22 pages.

Allidex, Frequently Asked Questions, retrievd Nov. 4, 2003, from http://www.allidex.com/faw.html. 4 pages.

Amazon.com, Inc., Associates: Enhance Your Site Using Web Services, retrieved Nov. 4, 2003, from http://www.amazon.com/gp/browse.html/ref=sc_bb_1_1/104-7530911-9659969?no=3435361&me=A3.6.L, 2 pages.

Amazon.com, Inc. Developers: Build Solutions for Amazon Partners, retrieved Nov. 4, 2003, from http://www.amazon.com/gp/browse.html/ref=sc_bb_1_1/104-7530911-9659969?no=3435361&me=A3.6.L, 2 pages.

Amazon.com, Inc., Sellers and Vendors: Sell More Using Web Services, retrieved Nov. 4, 2003, from http://www.amazon.com/gp/browse.html/ref=sc_bb_1_1/104-7530911-9659969?no=3435361&me=A3.6.L, 1 page.

Amazon.com, Inc., Web Services FAQ's, retrieved Nov. 4, 2003, from http://www.amazon.com/gp/browse.html/ref=sc_bb_1_0/104-7530911-9659969?no=3435361&me=A3.6.L, 11 pages.

Amazon.com, Inc., Web Services, retrieved Nov. 4, 2003, from http://www.amazon.com/gp/browse.html/104-7530911-9659969?node=3435361, 2 pages.

Andrews, T., et al., "Specification: Business Process Execution Language for Web Services Version 1.1," IBM developerWorks, May 5, 2003, retrieved Jan. 31, 2005, from http://www-106.ibm.com/developerworks/webservices/library/ws-bpel/, 124 pages.

Binstock, A., "Staking New Territory, Breaking New Ground," retrieved Sep. 9, 2005, from http://archive.devx.com/javaSR/articles/binstock/binstock.asp, 6 pages.

Box, Don et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.

Brown, R., "Epicentric Unveils Web Services E-Hub," Mar. 21, 2001, Line56.com, retrieved Sep. 9, 2005, from http://www.line56.com/print/default.asp?ArticleID=2287 2 pages.

Bunting, Doug et al., "Web Services Composite Application Framework (WS-CAF),". Jul. 28, 2003, retrieved from http://www.oasis-open.org/committees/download.php/4343/WS-CAF%20Primer.pdf, 23 pages.

Burbeck, S., "The Tao of E-Business Services—The Evolution of Web Applications Into Service-Oriented Components With Web Services," Oct. 2000, IBM®, http://www-4.ibm.com/software/developer/library/ws-tao/index.html, 13 pages.

Business Wire, "Desktop.com Introduces Devtop, the First Integrated Platform for Building, Deploying, and Distributing Wed-Based Application," Jun. 26, 2000, retrieved Sep. 8, 2005, from http://www.findarticles.com/p/articles/mi_m0EIN/is_2000_June_26/ai_62915951/print, 2 pages.

Clark, M., "Business Architecture for a Web Services Brokerage—Understanding The Business Context of Web Services," Aug. 1, 2001, retrieved Aug. 2, 2005, from http://www.webservicesarchitect.com/content/artciles/clark01print.asp, 5 pages.

CPA2Biz, Inc., "New Rivio Business Services Suite," Apr. 18, 2001, retrieved Sep. 8, 2005, from https://www.cpa2biz.com/Corp/Press+Releases/PR_WebTools_18APR01.htm, 3 pages.

CPA2Biz, Inc., "Verizon Unveils Rivio Web Services Suite for Small Business Customers," May 29, 2001, retrieved Sep. 22, 2005, from https://www.cpa2biz.com/Corp/Press+Releases/PR_VERIZON_29MAY01.htm, 3 pages.

E2OPEN™, E2open Products, retrieved Nov. 7, 2003, from http://www.e2open.com/products/, 3 pages.

E2OPEN™, The E2open Integration Platform, retrieved Nov. 7, 2003, from http://www.e2open.com/downloads/e2open_integration_platform_datasheet.pdf, 5 pages.

ebizQ, Product Quicktake, retrieved Nov. 7, 2003, from http://www.ebizq.net/reports/1884.html?download=1, 2 pages.

Grand Central™ Communications website, retrieved Nov. 6, 2003, from http://www.grandcentral.com/products/, 2 pages.

Grand Central™ Communications, Frequently Asked Questions, retrieved Nov. 6, 2003, from http://www.grandcentral.com/products/faqs/index_html, 5 pages.

Irani, R., "Web Services Intermediaries—Adding Value to Web Services," Nov. 21, 2001, retrieved Aug. 2, 2005, from http://www.webservicesarchitect.com/content/articles.irani07print.asp, 5 pages.

Jamcracker, Inc., "Jamcracker announces Pivot Path: Fully integrated software suite for Identity Management," Nov. 11, 2003, retrieved Sep. 12, 2005, from http://web.archive.org/web/20040607054618/http://jamcracker.com/pivot_path_release.pdf, 2 pages.

Khare, R., "Whiz-Bangery, Indeed: Primordial's WSBANG," Nov. 16, 2001, retrieved Sep. 9, 2005, from http://lair.xent.com/pipermail/fork/2001-November./006569.html, 2 pages.

Lee, Yvonne L., "StrikeIron's Hot for Web Services," *SD Times*, Jun. 1, 2004, retrieved Sep. 12, 2005, from http://www.strikeiron.com/doc/SDTimes060104.pdf, 1 page.

Levitt, J., "From EDI to XML and UDDI: A Brief History of Web Services," Oct. 1, 2001, InformationWeek, retrieved Sep. 9, 2005, from http://www.informationweek.com/story/IWK20010928S0006, 3 pages.

Leymann, F., "Web Services Flow Language (WSFL 1.0)," IBM Software Group, May 2001, 108 pages.

Oasis, UDDI.org, retrieved Sep. 8, 2005, from http://www.uddi.org/find.html, 2 pages.

PayPal.com, Recurring Billing Service: How it Works, retrieved Dec. 5, 2006, from http://www.paypal.com/cgi-bin/webscr?cmd=_payflow-recurring-billing-integration-outside, 2 pages.

PayPal.com, Recurring Billing Service: FAQs, retrieved Dec. 5, 2006, from http://www.paypal.com/cgi-bin/webscr?cmd=_payflow-recurring-billing-faq-outside, 3 pages.

Radding, A., "Generating Revenue from Web Services—Six Vendors With the Right Tools," Jan. 20, 2003, retrieved from http://72.14.207.104/search?q=cache:W5EXBA4Lr54J:home.comcast.net/~alanradding/iaws.pdf+generating+revenue+from+web+services+radding&hl=en&gl=us&ct=clnk&cd=3, 4 pages.

Sabre Travel Network, Sabre Travel Network Launches Web Services Capabilities for Agents. Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.

SalCentral, Subscription of Web Services, Oct. 5, 2003, retrieved Sep. 7, 2005, from http://web.archive.org/web/20031005075820/www.salcentral.com/salnet/wpsubws.htm, 5 pages.

SalCentral, The Napster of Web Services, Oct. 4, 2003, retrieved Sep. 7, 2005, from http://web.archive.org/web/20031004143406/www.salcentral.com/salnet/webservicesnapster.asp, 2 pages.

SalCentral, WSDL, SOAP and Web Services and Quality Assurance and promotion, Oct. 4, 2003, retrieved Sep. 7, 2005, from http://web.archive.org/web/20031004143940/www.salcentral.com/salnet/webservicewhat.asp, 2 pages.

SalCentral, WSDL, SOAP, Web Services Search Engine and Web Service Tracking, Oct. 11, 2003, retrieved Oct. 6, 2005, from http://web.archive.org/web/20031011101544/www.salcentral.com/salnet/webserviceswsdlne.asp, 1 page.

Samtani, G., et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.

Schofield, J., "The Third Era Starts Here," *The Guardian*, May 29, 2003, retrieved Nov. 4, 2003, from http://www.guardian.co.uk/print/0,3858,4678440-110837,00.html, 3 pages.

Siddiqui, B., "UDDI Based Electronic Marketplaces—Easier Integration With UDDI and WSDL," Feb. 20, 2002, retrieved Aug. 2, 2005, from http://www.webservicesarchitect.com/content/articles/siddiqui02print.asp, 4 pages.

Sirin, E., et al., "Semi-automatic Composition of Web Services Using Semantic Descriptions," In *Web Services: Modeling, Architecture and Infrastructure workshop in ICEIS 2003*, Angers, France, Apr. 2003, from http://www.mindswap.org/papers/composition.pdf, 9 pages.

Smith, Rick, "Striking While the Iron is Red Hot: StrikeIron Unveils Its Web Network," *LocalTechWire*, Jun. 25, 2004, retrieved Sep. 22, 2005, from http://www.localtechwire.com/article.cfm?u=8509, 3 pages.

SoftwareMarkets.com, Frequently Asked Questions from Developers, Sep. 18, 2000, retrieved Sep. 8, 2005, from http://web.archive.org/web/20000918003355/www.softwaremarkets.com/info/faqdevs.html, 3 pages.

Sterling Commerce, Sterling Information Broker, retrieved Nov. 10, 2003, from http://www.sterlingcommerce.com/PDF/Solutions/Sterling/SC0040.InfoBrokerOver.6-02.pdf, 4 pages.

Sterling Commerce, Sterling Information Broker, retrieved Nov. 10, 2003, from http://www.sterlingcommerce.com/solutions/em/commerce/iibs.html, 3 pages.

StrikeIron, Inc., "StrikeIron Launches the Web Services Business Network," Jun. 23, 2004, retrieved Sep. 8, 2005, from http://www.strikeiron.com/news/si_launches.aspx, 3 pages.

StrikeIron, Inc., "StrikeIron Web Servcies Business Network Overview," retrieved Sep. 12, 2005, from http://www.strikeiron.com/doc/StrikeIronWebServicesBusinessNetworkOverview.pdf, 24 pages.

StrikeIron, Inc., Frequently Asked Questions, retrieved Dec. 5, 2006, from http://www.strikeiron.com/info/faqs_p.aspx, 5 pages.

StrikeIron, Inc., What is Invoke Through Compensation, retrieved Dec. 5, 2006, from http://www.strikeiron.com/info/whatisinvokethrough.aspx, 3 pages.

Taft, Darryl K., "Start-Up Presents ASP Opportunity for Java Developers," *CRN*, Jul. 31, 2000, retrieved Sep. 20, 2005, from http://www.crn.com/sections/breakingnews/breakingnews.jhtml?articleId=18834381, 3 pages.

Tolksdorf, R., et al., "A Web Services Market Model Based on Dependencies," retrieved Sep. 9, 2005, from http://www.wiwiss.fu-berlin.de/suhl/bizer/pub/p49-tolksdorf.html, 4 pages.

UNISYS, Web Service Marketplace, retrieved Nov. 4, 2003, from http://www.unisysfsp.com/default.aspx?catID+16, 2 pages.

W3C, "WS Choreography Model Overview," Mar. 24, 2004, retrieved Sep. 8, 2005, from http://www.w3.org/TR/2004/WD-ws-chor-model-20040324/, 35 pages.

Waldspurger C. A. et al., "Spawn: A Distributed Computational Economy," May 1989, Xerox Palo Alto Research Center, pp. 1-32, 32 pages.

Web Services Architect, Web Services Resources, retrieved Nov. 6, 2003, from http://webservicesarchitect.com/resources.asp, 6 pages.

WestGlobal mScape™, Web Services Business Management System, retrieved Nov. 7. 2003, from http://www.westglobal.com/downloable_media/mscape_literature.zip, 18 pages.

Westglobal, Products—Overview, retrieved Nov. 7, 2003, from http://www.westglobal.com/products/mscape_overview.htm, 3 pages.

Westglobal, Products—Revenue Management Module, retrieved Nov. 7, 2003, from http://www.westglobal.com/products/mscape_revman.htm, 3 pages.

Xmethods website, retrieved Nov. 6, 2003, from http://www.xmethods.net/, 3 pages.

ZapThink, LLC, ZapThink Briefing Note—Oct. 8, 2002, retrieved Nov. 7, 2003, from http://www.grandcentral.com/assets/docs/GC.zapthink_report.pdf, 5 pages.

* cited by examiner

| | 204 | |
|---|---|---|
| | | Component Service Use Price |
| | Component Service AAA | |
| 206a | GB-Month of storage used | $0.15 |
| 206b | GB of data transferred | $0.20 |
| | Component Service BBB | |
| 206c | CPU-hour | $0.10 |

|  | 204<br>Component Service Use Price | 214<br>Enhanced Service MMM Use Price |
|---|---|---|
| Component Service AAA |  |  |
| 216a    GB-Month of storage used | $0.15 | $1.00 |
| 216b    GB of data transferred | $0.20 | $1.00 |

Provide Pricing Information for Enhanced Service MMM

Please follow these two steps to define Enhanced Service MMM pricing:

1. Define the price you will charge for the dimensions on which Services used by the enhanced service are charged. For instance, if Enhanced Service MMM uses Service AAA, you will define a price for *GB-Months of storage used* and *GB of data transferred*.

2. Optionally define a fixed, one-time fee, and/or monthly recurring fee.

Please define the prices in the tables below. On the next screen, you will be able to review the net proceeds you would obtain given the pricing defined below.

STEP 1: Enhanced Service MMM for Service AAA

| Pricing Use Dimension & Amount of Use | Enhanced Service MMM Price | Service Price | Optional Explanation of Pricing Dimension (e.g. *This is approximately 200 MP3s stored for a month*) |
|---|---|---|---|
| GB-Month of storage used | $1.00 | $0.15 | |
| GB of data transferred | $1.00 | $0.20 | |

STEP 2: Optional Enhanced Service MMM Monthly and/or One-Time Fees

| | Pricing Use Dimension | Enhanced Service MMM Price | Optional Explanation of Pricing Dimension (e.g. *This is a recurring monthly fee*) |
|---|---|---|---|
| ☐ | Monthly Fee | $0.00 | |
| ☑ | One-Time Fee | $5.00 | |

Click *Continue* to review Enhanced Service MMM pricing.

|  |  | Component Service Use Price | Enhanced Service MMM Use Price | Enhanced Service NNN Use Price |
|---|---|---|---|---|
|  | Component Service AAA |  |  |  |
| 226a | GB-Month of storage used | $0.15 | $1.00 | $1.25 |
| 226b | GB of data transferred | $0.20 | $1.00 | $1.00 |
|  | Component Service BBB |  |  |  |
| 226c | CPU-hour | $0.10 |  | $0.50 |

| | | Component Service Price | Enhanced Service MMM Price | Enhanced Service NNN Price | Application Program SSS Price |
|---|---|---|---|---|---|
| | | 204 | 214 | 224 | 234 |
| | Component Service AAA | | | | |
| 236a | GB-Month of storage used | $0.15 | $1.00 | $1.25 | $1.25 |
| 236b | GB of data transferred | $0.20 | $1.00 | $1.00 | $1.50 |
| | Component Service BBB | | | | |
| 236c | CPU-hour | $0.10 | | $0.50 | $0.75 |

| | | 204 | 214 | 224 | 234 | 244 |
|---|---|---|---|---|---|---|
| | | Component Service Price | Enhanced Service MMM Price | Enhanced Service NNN Price | Application Program SSS Price | Application Program TTT Price |
| | Component Service AAA | | | | | |
| 246a | GB-Month of storage used | $0.15 | $1.00 | $1.25 | $1.25 | $2.00 |
| 246b | GB of data transferred | $0.20 | $1.00 | $1.00 | $1.50 | $2.00 |
| | Component Service BBB | | | | | |
| 246c | CPU-hour | $0.10 | | $0.50 | $0.75 | $1.00 |
| | Application Program TTT | | | | | |
| 246d | Per use | | | | | $0.01 |

| | | 204 Component Service Price | 214 Enhanced Service MMM Price | 224 Enhanced Service NNN Price | 254 Application Program UUU Price |
|---|---|---|---|---|---|
| | Component Service AAA | | | | |
| 256a | GB-Month of storage used | $0.15 | $1.00 | $1.25 | $1.50 |
| 256b | GB of data transferred | $0.20 | $1.00 | $1.00 | $1.50 |
| | Component Service BBB | | | | |
| 256c | CPU-hour | $0.10 | | $0.50 | $0.75 |
| | Component Service CCC | | | | |
| 256d | Per Thousand Messages | $0.25 | | | $0.50 |

| | | Component Service Price | Enhanced Service MMM Price | Enhanced Service NNN Price | Enhanced Service OOO Price |
|---|---|---|---|---|---|
| | Component Service AAA | | | | |
| 266a | GB-Month of storage used | $0.15 | $1.00 | $1.25 | $0.50 |
| 266b | GB of data transferred | $0.20 | $1.00 | $1.00 | $2.00 |
| | Component Service BBB | | | | |
| 266c | CPU-hour | $0.10 | | $0.50 | |
| | Enhanced Service OOO | | | | |
| 266d | Per photo manipulated | | | | $0.10 |

| | 301 | 303 | 305 | 307 | 309 | 311 |
|---|---|---|---|---|---|---|
| Use Dimensions | Program Use Price Paid by the End User | Application Creator's Net Proceeds | Enhanced Service Use Price | Enhanced Service Provider's Net Proceeds | Component Service Use Price | CSSUF Fees |
| 315a GB-Month of storage used | $2.00 | $0.90 | $1.00 | $0.76 | $0.15 | $0.19 ($0.09 + $0.10) |
| 315b GB of data transferred | $1.50 | $0.45 | $1.00 | $0.72 | $0.20 | $0.13 ($0.08 + $0.05) |
| 315c Enhanced service fees | $2.00 | $0.00 | $2.00 | $1.80 | | $0.20 |
| 315d Program fees | $1.00 | $0.90 | | | | $0.10 |

*Fig. 3*

PROVIDING CONFIGURABLE USE BY APPLICATIONS OF SEQUENCES OF INVOCABLE SERVICES

CROSS REFERENCE TO RELATED APPLICATIONS

This application is related to U.S. patent application Ser. No. 11/618,469, filed concurrently and entitled "Providing Configurable Pricing For Use Of Invocable Services By Applications," and to U.S. patent application Ser. No. 11/618,480, filed concurrently and entitled "Using Configured Application Pricing To Determine End User Fees For Use Of Invocable Services," each of which is hereby incorporated by reference in its entirety.

TECHNICAL FIELD

The following disclosure relates generally to facilitating use of sequences of invocable services in a configurable manner, such as to enable applications to provide capabilities to end users that are based in part on use of sequences of multiple third-party fee-based invocable services.

BACKGROUND

Various mechanisms exist to allow computers and executing software applications to interact. For example, remote procedure call ("RPC") protocols have long existed that allow a program on one computer to cause a program on another computer to be executed. In a similar manner, various object-oriented architectures such as CORBA ("Common Object Request Broker Architecture") and DCOM ("Distributed Component Object Model") provide remote execution capabilities. In addition, various middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via Web browser applications executing on user computers) and receiving the requested information in response. In addition, there is also growing use of the Web to support the programmatic interaction of remote applications to exchange information via defined APIs ("application program interfaces"), such as via Web services. Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Although Web services and other mechanisms allow various applications and computers to interact, various problems exist with the use of such interaction mechanisms. For example, if a developer of an application would like to incorporate the use of fee-based Web services that are available from third parties in the application, but in a manner that the end users of the application will be responsible for corresponding fees, such functionality is typically difficult and costly to implement. In addition, many fee-based Web services may offer relatively limited capabilities, and a user may desire to offer to others a new fee-based Web service with enhanced capabilities based on use of one or more other third-party fee-based Web services, but such functionality is also typically difficult and costly to implement. Such functionality may include, for example, mechanisms to track the use of the various services and determine corresponding fees, as well as mechanisms to collect specified payments from users of the services and to allocate such payments among the various service providers.

BRIEF DESCRIPTION OF THE DRAWINGS

FIGS. 2A-2H illustrate examples of configuring use of a sequence of invocable fee-based services.

FIG. 3 illustrates an example of allocation of the fees paid by an end user for use of a sequence of invocable fee-based services via an application.

DETAILED DESCRIPTION

Figure 1A:
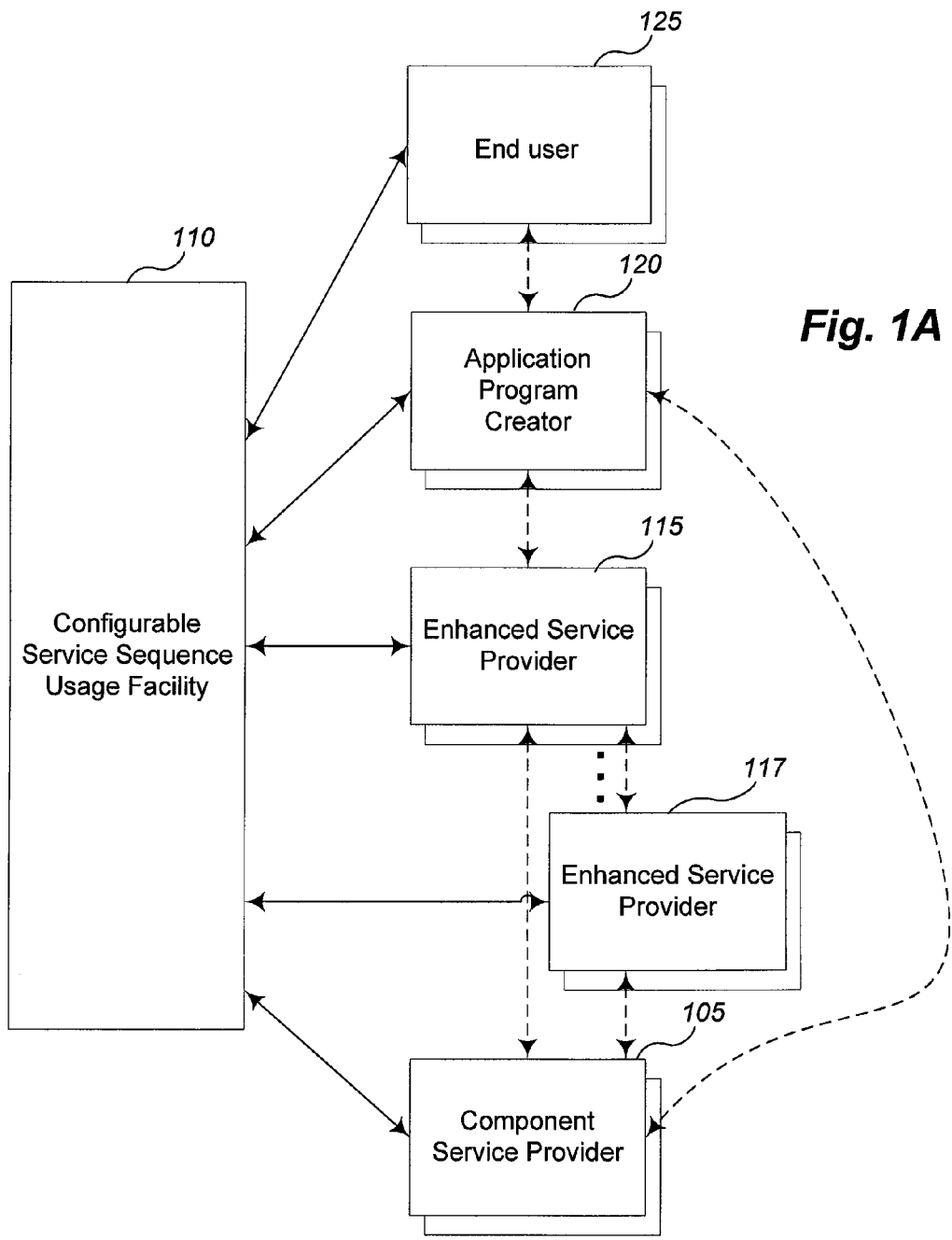
FIGS. 1A-1B illustrate examples of interactions to facilitate use by applications of sequences of invocable services.

Techniques are described for facilitating use of sequences of invocable services in a configurable manner, including by providing a metering service that tracks the use of invocable services by other invocable services or applications. In at least some embodiments, the invocable services are fee-based Web services or other fee-based network-accessible services, and are made available by providers of the services for use by others in exchange for fees defined by the service providers. The described techniques facilitate use of a sequence of such invocable services by applications in a manner configured by the creators of the applications and providers of the services, including to allow the application creators to define pricing terms that will be used to determine fees that end users of the applications will be charged for use of the invocable services via the applications. In at least some embodiments, the described techniques are performed by an automated Configurable Service Sequence Usage Facility ("CSSUF") system, as described in greater detail below.

In at least some embodiments, a user associated with an invocable service (e.g., a service developer user or other service creator user that is involved in the creation of the invocable service) may interact with an embodiment of the CSSUF system to configure pricing terms and other information for use of the invocable service by others. Some such invocable services are component invocable services that provide capabilities to others, such as for a fee, but that do not use the capabilities of other invocable services via the CSSUF system as part of providing their own capabilities. Other such invocable services are enhanced invocable services that provide capabilities to others, such as for a fee, but whose provided capabilities are based at least in part on use of the capabilities of one or more other invocable services via the CSSUF system, such as other fee-based component and/or enhanced services that are provided by third parties. For example, an enhanced service may offer a fee-based image processing service to others, but use a third-party component service for storage of images. In at least some embodiments, an enhanced service may also use capabilities and functionality provided by one or more applications or other services that do not occur via the CSSUF system. In at least some embodiments, the pricing terms and other information for an invocable component or enhanced service are specified as part of a configured usage model for the invocable service with the CSSUF system, with a usage model in some embodiments and situations including an indicated price for an indicated amount of use of an indicated use dimension (e.g., an indicated price for each use of the service, an indicated price per amount of time of use, an indicated price per unit of processing time, an indicated price per unit of storage used, an indicated price for a predetermined number of times of use in a predetermined period of time, etc.).

After a fee-based component service has specified pricing information for its use that is available via the CSSUF system (e.g., as part of a configured usage model for the component service), users associated with enhanced invocable services may interact with an embodiment of the CSSUF system to each configure fee-based use by the enhanced service of the component service. Similarly, after a first fee-based enhanced service has associated configured pricing information for its use that is available via the CSSUF system (e.g., as part of a configured usage model for the first enhanced service), a user associated with another enhanced invocable service may similarly interact with an embodiment of the CSSUF system to configure fee-based use by the other enhanced service of the first enhanced service. In particular, in at least some embodiments, to perform the configuration of an enhanced service that is based on one or more other invocable services, a user associated with the enhanced service selects the one or more other invocable services via the CSSUF system, and configures one or more usage models for use with the enhanced service that correspond to the selected invocable services. When an invocable service to be used by an enhanced service has an associated usage model, the usage model that is configured for the enhanced service using the invocable service may be based on the associated usage model for the invocable service, such as to use at least some of the same types of pricing terms and other information. For example, if an invocable service being used by an enhanced service has an indicated price for an indicated amount of use with respect to an indicated use dimension, the configured usage model for the enhanced service may maintain the same indicated amount of use with respect to the same indicated use dimension, but may specify a distinct configured price for that amount of use with respect to that use dimension. Alternatively, in some embodiments and situations, the configured usage model for the enhanced service may differ in other ways from an associated usage model of an invocable service being used, such as by having a differing configured amount of use and/or a differing configured use dimension. In this manner, sequences of invocable services may be incrementally defined, with each service in the sequence able to configure fees for its use that may be based in part on fees of other services that are used. Furthermore, in at least some embodiments and situations, at least some invocable services may not have associated pricing terms, or may use pricing terms that are the same as another invocable service being used by the invocable service.

As previously noted, enhanced invocable services may be configured via the CSSUF system to each provide capabilities to users based at least in part on using capabilities of one or more other component or enhanced services. By allowing enhanced services to use other component or enhanced services, each such enhanced service may act as a first service in a sequence of multiple invocable services. When such a first enhanced service in a sequence is invoked or otherwise accessed by an application, the other services in the sequence may then in at least some situations be consecutively invoked, with the first service in the sequence invoking one or more next second services in the sequence as part of providing the capabilities of the first service. One or more of the second services in the sequence may each then invoke one or more next third services in the sequence as part of providing the capabilities of the second service, and so on, until a last component service in the sequence is invoked that provides its capabilities without using other services via the CSSUF system. In some situations, however, a service in a sequence other than the last service may not invoke a next service each time that the service is invoked, such as if the next service is invoked only in a subset of situations in which the capabilities of the next service are to be used. Furthermore, it will be apparent that a sequence of services may have a form other than a linear sequence, such as to include branching if an enhanced service uses multiple other component and/or enhanced services. In addition, individual component and enhanced services may be used as part of many distinct sequences of services, and a given sequence of services may be a subset of one or more other sequences of services while also being available for use as its own sequence of services.

With regard to the prior example of an enhanced image processing service based on a component storage service, the component storage service may charge a first price for each megabyte of data stored, for example, and the enhanced service may charge a second higher price for each megabyte of data stored by the component storage service via the enhanced service. If so, the additional cost from the second higher price may, for example, reflect the additional image processing capabilities of the enhanced service. Another enhanced photo storage and manipulation service may then be configured to use capabilities of the image processing service (and indirectly the capabilities of the component storage service via the image processing service), for example, but may charge prices based on a different use dimension than the image processing service. For example, the photo storage and manipulation service may charge fees based a number of photos stored and/or manipulated by an end user, whether instead of or in addition to fees based on the number of megabytes of storage that are used when storing and manipulating the photos. Additional details regarding the configuration and use of sequences of invocable services are discussed below, including with respect to FIGS. 2A-2H.

In a manner similar to the configuring of pricing terms and other information for use of invocable services by others via the CSSUF system, users associated with applications (e.g., application developer users or other application creator users that are involved in creation of the applications) may interact with an embodiment of the CSSUF system to configure pricing and other information for use of selected invocable services via the application, such as based on one or more configured usage models. When a selected invocable service is the first service in a sequence of multiple invocable services, the application may thus have a configured usage model for that sequence of multiple services, whether or not the application is aware of other services in the sequence after the first service. Types of applications that may use such invocable services may include, for example, application programs designed to execute on computing devices of end users, as well as server-based applications that end users may access using remote client devices (e.g., Web applications accessed via a Web browser executing on a client device of an end user). As with enhanced services, the configured usage model for an application may differ from the usage model of a selected invocable service (or sequence of services) in one or more ways, such as by having a differing use price, a differing amount of use, and/or a differing use dimension.

After a user configures a usage model via the CSSUF system for an enhanced service or application to use one or more selected invocable services, the CSSUF system provides the user with an application key (e.g., an alphanumeric string) for use with the enhanced service or application in order to facilitate tracking of the use of invocable services by the enhanced service or application. In particular, the application key is for use when the application or enhanced service makes use of a selected invocable service, such as by including the application key when making a call to invoke or request access to the selected invocable service. When the application key is received by the CSSUF system based on the use of a selected invocable service, the application key may be used by the CSSUF system to identify the application and/or enhanced service that used another service, and to track the use by that application or enhanced service.

For example, consider a situation in which an application is configured to use a first enhanced service in a sequence of multiple services, in which the first service is configured to use a next second enhanced service in the sequence, and in which the second service is configured to use a last component service in the sequence. In this example, the first service receives a first application key, the second service receives a second application key, and the application receives a third application key, with the application using the third application key when accessing the first service. In some embodiments, when accessing the first service, an access request that includes the third application key will be made by the application to the CSSUF system, so that the CSSUF system may provide authentication functionality to determine whether the access request is approved based on the configured usage model(s) of the application and/or on subscription(s) of the end user for the application, as discussed below. In other embodiments, the first service will be directly invoked by the application without making an access request to the CSSUF system, and the first service will receive the third application key from the application. In some embodiments, the first service may be configured to report the invocation to the CSSUF system (e.g., if the first service is directly invoked by the application without using an access request via the CSSUF system), such as by providing the received third application key to the CSSUF system.

If the first service then invokes the second service in the sequence as part of providing capabilities in response to the application's use of the first service, the application's third application key and/or the first service's first application key may similarly be used to track the continuing service usage. In a similar manner to that previously discussed, one or both of those keys may be sent to the CSSUF system as part of an access request to use the second service, and/or one or both keys may be directly sent to the second service as part of an invocation request by the first service. For example, if the application's third application key is associated with the use of the sequence of services (e.g., with the first and second application keys of the first and second services), then only the third application key may be passed to the second service, as the use of the third application key may allow an automatic determination based on the association that the use occurred via the first service. In addition, as with the first service, the second service may in some embodiments provide information to the CSSUF system to report its invocation, and if so may include the first and/or third application keys that were received. Alternatively, in other embodiments, only a last component service in a sequence may report the use of the services of the sequence to the CSSUF system, such as by supplying the one or more application keys that it receives to the CSSUF system. An invocable service reporting its use may further indicates a particular amount of use of the invocable service that occurred with respect to a particular use dimension.

In a similar manner to that described above, the second service may similarly invoke the last component service in the sequence as part of providing capabilities to the first service in response to the application's use of the first service. As part of the invocation, one or more of the first, second and third keys may similarly be provided to the last component service and/or the CSSUF system by the second service in order to enable tracking of the continuing service use. As previously noted, only the application's third key may be provided in at least some embodiments if it is associated with the sequence of services. In this manner, the CSSUF system obtains information in one or more ways about the use of the various invocable services, and tracks the use of the various services in the sequence. The tracking of the use of a particular invocable service may include, for example, associating the use with a particular application using a sequence of services, such as on behalf of a particular end user.

When appropriate (e.g., once a month, for each service usage, etc.), the configured usage model(s) corresponding to use of one or more invocable services may be retrieved, and appropriate pricing terms may be determined from the configured usage model(s) in order to determine fees to be charged for the use of each service. In some embodiments, an end user of an application may further be charged fees based on a configured usage model for the application, with the fees received from the end user being allocated between the application and the invocable services in the sequence in accordance with the usage models of the services.

In addition, in some embodiments, before an end user may access selected services via an executing copy of an application, or further before the end user may obtain access to any functionality of the application in some embodiments, the end user first subscribes to the use of those services via the application. In particular, the end user may be directed to interact with the CSSUF system to perform the subscription, which may include providing payment information for fees to be charged to the end user, as well as to provide other information to the CSSUF system (e.g., end user contact information, an indication of assent to any specified terms and conditions for the application and/or the selected services, etc.). The end user may be directed to interact with the CSSUF system at various times and in various ways in various embodiments, including when the end user is first purchasing or otherwise acquiring the application, when the end user first attempts to use the application, when the end user first attempts to use a selected service via the application, etc. In addition, in some embodiments, the end users are charged recurring fees (e.g., monthly fees) and/or one-time fees (e.g., setup fees), which may be charged in advance (e.g., at a beginning of a month for which a monthly fee corresponds) and/or periodically after use has occurred (e.g., at the end of a month for any use in excess of a standard monthly charge during that month). Accordingly, an end user subscription may in some embodiments and situations be for recurring use of an application and service(s) (e.g., a monthly subscription that is automatically renewed unless otherwise specified), while in other situations may have other forms (e.g., for a single use, for use for only a limited specified time, for use for only a limited number of times, etc.).

After an end user subscribes to use of the selected services for an indicated application, the end user in at least some embodiments is provided with a user token (e.g., an alphanumeric string) for use with a copy of the application. The user token (or other user information based on the user token, such as a user credential, discussed below) may be used in a manner similar to the application keys, such as by including the user information as part of a call by the end user's copy of the application to invoke or request access to a sequence of invocable services. When the user token or other user information is received by the CSSUF system as part of the use of one or more invocable services, the user information may be used by the CSSUF system to identify the end user on whose behalf the service use occurred (and if the user tokens are specific to the applications with which they are used, to identify the application that used the service), and to track the use by that end user. When appropriate (e.g., once a month, for each service usage, etc.), the payment information specified by the end user may be retrieved and used for providing payment from the end user for use of the invocable services via the application, such as based on the configured usage model for the application.

As one particular example of how end user interaction with the CSSUF system occurs, in some embodiments an application with one or more configured usage models for selected services receives not only an application key to be used as part of the application, but also a reference to the CSSUF system to be used to facilitate subscriptions by end users (e.g., an Internet URL that directs an end user to the CSSUF system). When an end user requests to purchase or otherwise acquire the application (e.g., by interacting with a Web site of the application creator), the end user is directed to the CSSUF system to complete the subscription process and receive a user token. The end user acquires a copy of the application (e.g., by downloading the application copy from the Web site of the application creator), and supplies the user token to the acquired application copy as part of an initialization process of the application copy. During the initialization process, the application copy receives the user token, and interacts with the CSSUF system to obtain a user credential based on the user token. The user credential is then stored with the application copy, and used along with the application key to make service invocation calls or other requests to obtain access to selected invocable services.

Thus, both an application key and a user token (or a user credential based on one or both of them) may be supplied by an application when accessing invocable services on behalf of an end user in at least some embodiments. The use of the various invocable services on behalf of an end user is then metered (e.g., by tracking use based on the application key(s) and/or the user token or credential) by the CSSUF system or by an associated system, so that the end user may be charged appropriate fees for the use according to the configured usage model specified by the application creator for the application. The revenue collected based on the end user's use of the invocable service(s) may be subsequently split between the application creator and the one or more service providers of the invocable services, such as if the configured usage model for the application results in fees charged to the end user that are greater than fees charged by the providers of the invocable services. In some embodiments, if payment is not obtained from the end user for the use of invocable services, the application creator does not receive corresponding payment, but the application creator is also removed by the CSSUF system of liability for fees charged by the providers of the invocable services for the use of those invocable services in some embodiments. Similarly, in some embodiments, if the end user does not pay for his/her use of a sequence of services, enhanced service providers also have their liability removed for the use by the enhanced service of other invocable services in the sequence. Furthermore, as discussed above, in some embodiments and situations, the CSSUF system may provide authentication functionality, such as in response to an access request from an executing copy of an application to access a particular invocable service on behalf of an end user, or in response to an access request from an enhanced service to access a particular other invocable service on behalf of an application and/or end user. The authentication functionality may include determining whether the requesting application or enhanced service is authorized to access the particular invocable service, such as by retrieving information regarding any configured usage models for the application (and any subscription information for an end user, if the access request is on behalf of the end user).

In some embodiments, invocable services may further charge fees for their use based on multiple different use aspects (e.g., by specifying use prices with respect to multiple use dimensions). For example, an invocable storage service may charge fees based on the amount of data stored (e.g., with a first indicated price per megabyte of data) and on the number of times that storage and/or retrieval access occurs (e.g., with a second indicated price per access). Similarly, an application creator user or an enhanced service provider user may configure pricing terms that correspond to multiple use dimensions for an invocable service, whether based on the same multiple use dimensions as specified by the invocable service or not (e.g., by adding a use price for a second use dimension when the underlying invocable service specified a price for only a single use dimension). If a user specifies one or more custom use dimensions for use of an invocable service by an application or enhanced service that differ from the use dimensions specified by the invocable service, the application or enhanced service may further in some embodiments provide information to the CSSUF system during execution to specify how much usage has occurred with respect to those custom use dimensions.

In addition, in some embodiments the CSSUF system may charge various fees for the functionality that it provides. For example, the CSSUF system may charge a fee to an application creator user and/or service provider user for providing capabilities to allow the user to specify one or more configured usage models for selected invocable services, for providing capabilities to meter usage of invocable services and obtain corresponding payment from end users, for providing capabilities to pay service providers for use of their service based on corresponding payment from end users, etc. Furthermore, the fee charged may have various forms, such as a predetermined percentage (e.g., 10%) of the proceeds after paying service provider(s) for use of their services, a predetermined amount for each service (e.g., $0.50), etc., or a combination thereof.

As previously noted, the described techniques may be used in various manners in various embodiments. For example, the CSSUF system may be used with various types of applications, such as applications with a graphical user interface (e.g., desktop applications or Web applications), a command-line interface (e.g., for a system utility), or a programmatic interface. Similarly, the invocable services may be of various types including, but not limited to, Web services, storage services, indexing services, and queuing services. In addition, some or all of the invocable services may be provided by an entity providing the CSSUF system and/or by third-party service providers.

Additional details related to examples of functionality that may be provided by some embodiments of a CSSUF system are described with respect to embodiments of a Configurable Service Usage Facility system in U.S. patent application Ser. No. 11/618,469, filed concurrently and entitled "Providing Configurable Pricing For Use Of Invocable Services By Applications," and in U.S. patent application Ser. No. 11/618,480, filed concurrently and entitled "Using Configured Application Pricing To Determine End User Fees For Use Of Invocable Services," each of which is hereby incorporated by reference in its entirety.

FIG. 1A illustrates an example of interactions in which application creator users configure usage models for sequences of invocable services to be used via their applications, in which enhanced service providers configure usage models for other invocable services to be used by their enhanced services, and in which end users subsequently subscribe to use invocable services via the applications. In this example, the invocable services are network-accessible services, such as Web services or other services that may be remotely invoked or otherwise accessed over one or more computer or transmission networks.

In particular, component service providers 105 each offers one or more component network-accessible services (not shown) as being available to third parties via the Configurable Service Sequence Usage Facility ("CSSUF") system 110 in this example embodiment, with each component service having associated pricing terms (not shown). In this example, the associated pricing terms for each component service are specified via an associated usage model for the component service that includes an indicated use price for an indicated amount of use of an indicated use dimension.

After the component network-accessible services are specified to the CSSUF system 110, one or more enhanced service providers 115 each interacts with the CSSUF system to select one or more of the component services for use by an enhanced service (not shown) of the enhanced service provider that is being configured, configures one or more usage models (not shown) for use of the selected component services via the enhanced service, and receives an application key (not shown) for use with the enhanced service. When the enhanced services are completed, they will be available for use by applications via the CSSUF system, such as by acting as the first in a sequence of multiple invocable services that includes the selected component services. In at least some embodiments, some of the enhanced services may also use one or more other enhanced services, including enhanced services from different enhanced service providers 117 (e.g., unaffiliated third-party providers). Such enhanced service providers 117 similarly interact with the CSSUF system to configure usage models for selected component services to be used via enhanced services provided by the enhanced service providers 117, and receive corresponding application keys for use with their enhanced services. When the enhanced service providers 115 are interacting with the CSSUF system to configure usage models for selected invocable services to be used by their enhanced services, one or more of the service providers 115 may also in this example embodiment each select one or more of the enhanced services from the enhanced service providers 117, whether instead of or in addition to one or more component services. While not illustrated here, further levels of intermediate enhanced services may be selected for any particular sequence of services, with each enhanced service available to use any other available enhanced service as appropriate. In addition, in some embodiments enhanced service providers 115 may optionally interact with component service providers and other enhanced service providers to receive information about invocable services that are available for use, such as by receiving information about those service via a Web site (not shown) of a service provider.

One or more application creator users 120 may also each similarly interact with the CSSUF system to select one or more invocable services to use in their application (not shown), and configure one or more usage models for the use of the selected invocable services via the application. In this example embodiment, the invocable services used by an application may include a selected component service and/or a sequence of multiple invocable services that begins with a selected enhanced invocable service. After the usage model(s) for an application are configured, the application creator user receives an application key for use with the application for tracking service usage, and in this example embodiment further receives one or more URLs to use to direct end users to the CSSUF system to perform subscription activities regarding the application.

After an application from an application creator user 115 is completed and has appropriate configured usage models, an end user 125 may decide to acquire the application, such as by interacting with the application creator user's Web site (not shown) or in other manners (e.g., via other Internet sites, such as a Web site associated with the CSSUF system). The end user 125 then interacts with the CSSUF system 110 to subscribe to use of the selected invocable services via the application, such as by providing contact and payment information. The end user then receives a user token for use with a copy of the application, which may be any unique identifier (such as an alphanumeric string of a predetermined length). After using the user token to configure a copy of the application, the end user 125 may use the application copy to access the capabilities of the selected invocable services, as discussed with respect to FIG. 1B.

Figure 1B:
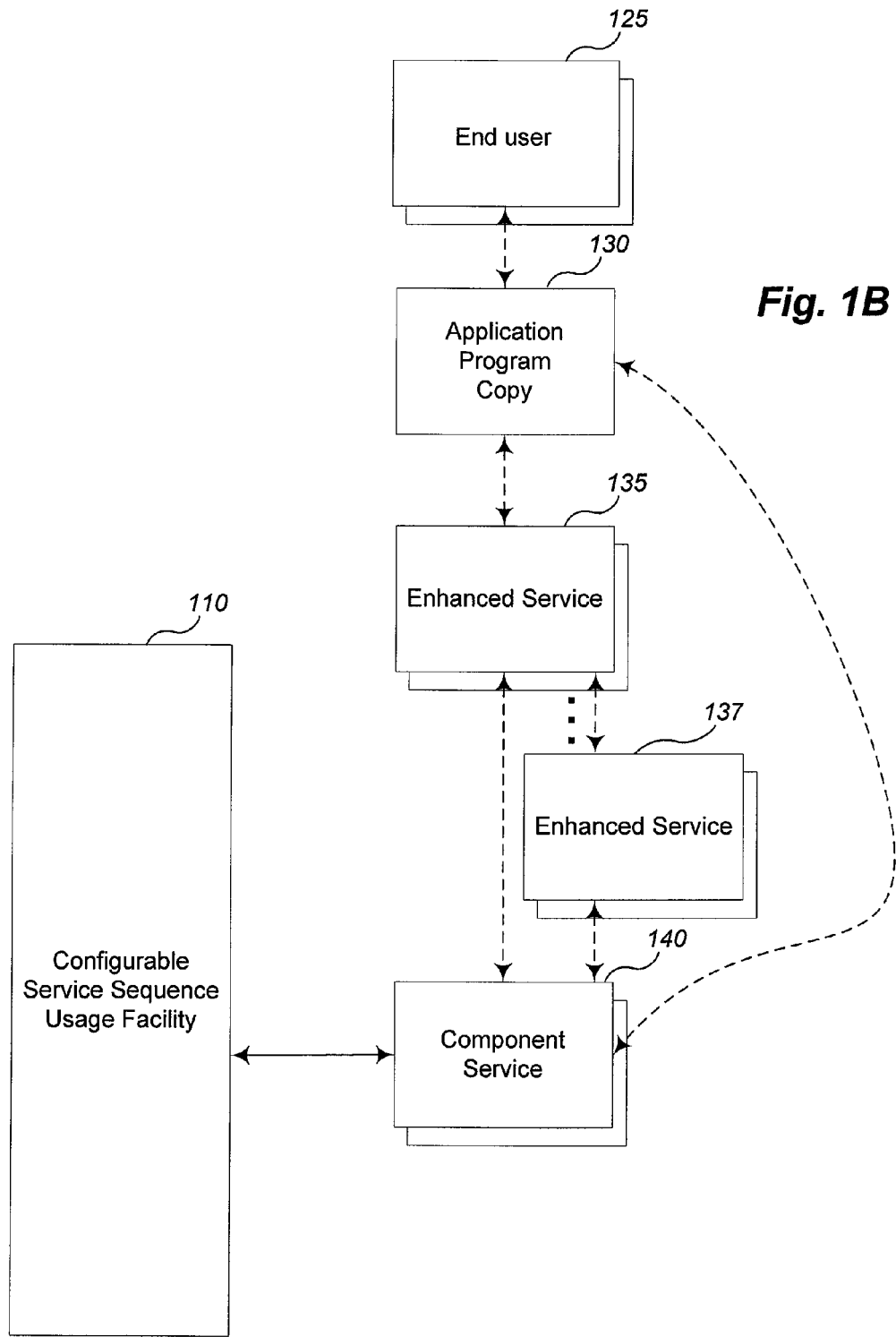

FIG. 1B illustrates an example of interactions in which applications use capabilities provided by sequences of invocable services on behalf of end users of the applications. In particular, after end users 125 have completed the subscription process for selected applications and have configured copies of the applications based on received user tokens, the executing application copies may use capabilities of the selected invocable services for which the application has configured access. FIG. 1B illustrates an example 130 of such an executing application copy being used by one of the end users 125. When executed, the application copy 130 invokes a sequence of multiple invocable services that in this example includes first enhanced service 135, optionally one or more next enhanced services 137, and finally one or more last component services 140. In the illustrated embodiment, the CSSUF system 110 is not called to provide authentication functionality prior to the application copy invoking the first enhanced service, or prior to any of the enhanced services in the sequence invoking a next service in the sequence. Furthermore, in this example, the application copy and the enhanced services do not directly provide reports to the CSSUF system of service invocations that they perform or receive. Thus, in order to provide metering that tracks use of the services, in this example embodiment, the component services notify the CSSUF system after they are invoked, such as to indicate an amount of use that occurred. Furthermore, to facilitate the metering, the component services in this example embodiment provide one or more application keys and end user information to the CSSUF system regarding their use. As previously noted, in some embodiments the application key of the application copy 130 and the end user information will be passed through the sequence of services to the component service, and the component service will provide that application copy application key to the CSSUF system. Alternatively, in other embodiments, some or all of the enhanced services in the sequence may pass along to the next service their own application keys, as well as any received application key(s), with the component service thus able to provide a sequence of multiple application keys the CSSUF system. In some embodiments, the component services may further have their own application keys that may also be provided to the CSSUF system. In other embodiments, the application copy and/or at least some of the enhanced services may instead interact directly with the CSSUF system and provide information directly regarding the service usage that occurred, including to obtain authentication functionality from the CSSUF system to determine whether access to an invocable service is allowed.

In some embodiments, application creator users 120 (not shown in FIG. 1B) may also interact with the CSSUF system to monitor use of invocable services by their applications and/or to monitor fees received by the application creator from end users for such use, such as in a substantially realtime manner with respect to the actual use of the invocable services. Similarly, in some embodiments, an end user 125 may interact with the CSSUF system to monitor use of invocable services on behalf of the end user via an application program copy, such as to determine any fees owed. The CSSUF system may also provide usage and/or billing statements to end users and/or providers of applications and services at various times, such as upon request (e.g., via a Web site of the CSSUF system), monthly, etc.

While not illustrated, some parties may serve multiple roles in FIGS. 1A and 1B. For example, an application creator user may also provide one or more invocable services that are available via the CSSUF system, such as to other providers. As another example, in some embodiments a single provider may provide both one or more enhanced services and one or more component services. Furthermore, in some embodiments the entity providing the CSSUF system may also provide one or more invocable services and/or create one or more applications for use by end users. In addition, some of the users may represent an entity (e.g., a company) instead of an individual.

For illustrative purposes, some embodiments are described below in which specific embodiments of the CSSUF system provide various specific types of capabilities with respect to various types of applications and invocable services, including using specific types of user interfaces and other interactions. However, it will be appreciated that the described techniques may be used in a wide variety of other situations, including with other types of invocable services, with other types of applications, with other types of user interfaces, with other types of user interactions, etc., and that the invention is not limited to the exemplary details provided.

Figure 2A:
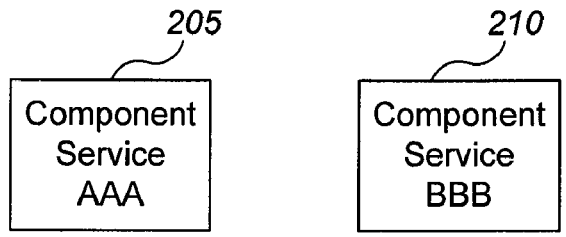

FIGS. 2A-2H illustrate examples of configuring use of a sequence of invocable fee-based services. In particular, FIG. 2A illustrates example specified pricing terms for two example component services, Component Service AAA 205 and Component Service BBB 210, which will be used as part of a sequence of services being configured. The specified pricing terms are illustrated in a table in FIG. 2A. Rows 206a-c each illustrate a use dimension for one of the component services (with rows 206a-b corresponding to component service AAA 205, and with row 206c corresponding to component service BBB 210), and the corresponding specified use prices are shown in column 204.

Figure 2B:
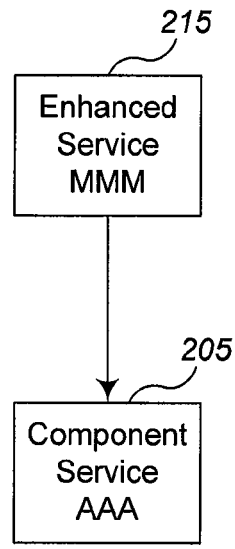

FIG. 2B illustrates an example enhanced service MMM 215 that is configured to use component service AAA 205, thus creating a sequence of the two services that may be accessed via enhanced service MMM. In the illustrated table, rows 216a-b illustrate the two use dimensions for service AAA 205, and column 204 repeats the specified corresponding use prices for component service AAA 205. New column 214 indicates new configured use prices for enhanced service MMM 215 for the two use dimensions of component service AAA 205, such as to reflect at least part of a configured usage model for enhanced service MMM. The specification of the configured use prices for enhanced service MMM 215 may occur in various ways, including interactively as illustrated in FIG. 2C.

FIG. 2C illustrates an example user interface for interactively specifying a configured usage model for use of component service AAA by enhanced service MMM. In this example, the selected service AAA has an associated usage model with specified pricing information with respect to two use dimensions. In some embodiments, some services may have multiple alternative associated usage models that a user of the service may choose from (e.g., different usage models corresponding to different quality of service levels). In this example, FIG. 2C includes an information section 217, a section 219 for configuring use prices for the enhanced service MMM, a section 221 for configuring optional recurring (e.g., monthly) and/or one-time fees, and a user-selectable control 223 for submitting the configured usage model to the CSSUF system. In this example, the information specified in sections 219 and 221 will be part of the configured usage model for use of the selected component service by the enhanced service MMM, although in other embodiments additional types of information may be specified (e.g., service-specific use restrictions, service-specific terms and conditions, etc.) and/or some of the illustrated types of information may not be available to be specified. If multiple component services had been selected for enhanced service MMM, similar information would be displayed for each of the services.

In this example, section 219 includes a row for each distinct use dimension specified in the associated pricing information for the selected component service, so as to allow a configured use price to be specified for each use dimension (if so desired). The associated pricing information for the component service is shown for each use dimension, and user-specifiable fields are present to allow the enhanced service provider user to specify a distinct configured use price for the same predetermined amount of use with respect to the use dimension. While not illustrated here, in some embodiments the enhanced service provider user may further be able to configure differing amounts of use and/or use dimensions. In this example, the enhanced service provider user may also specify an optional explanation for each fee to be charged, which will be provided to others who use the enhanced service to explain the configured pricing. Since multiple services or applications may each configure different usage models for those services' or applications' use of a single component service (e.g., component service AAA), an end user using multiple such applications may be charged different use fees for use of the same component service.

Although not shown, additional information may be specified for the configured usage model. For example, in some embodiments service provider users and/or application creator users may configure one or more use restrictions, such as to restrict a minimum or maximum use of a service, and/or to restrict the use of the service to a particular type of use (e.g., non-commercial use). In some embodiments, some or all of the use restrictions of a service are automatically incorporated as use restrictions for an enhanced service and/or application that uses the service, whether instead of or in addition to use restrictions configured specifically for the enhanced service or application. As a second example, service providers and/or application creator users may be able to specify particular aspects of billing, such as the billing cycle to be used, or the smallest increment in which to bill (e.g., in tenths of a GB/month).

Figure 2D:
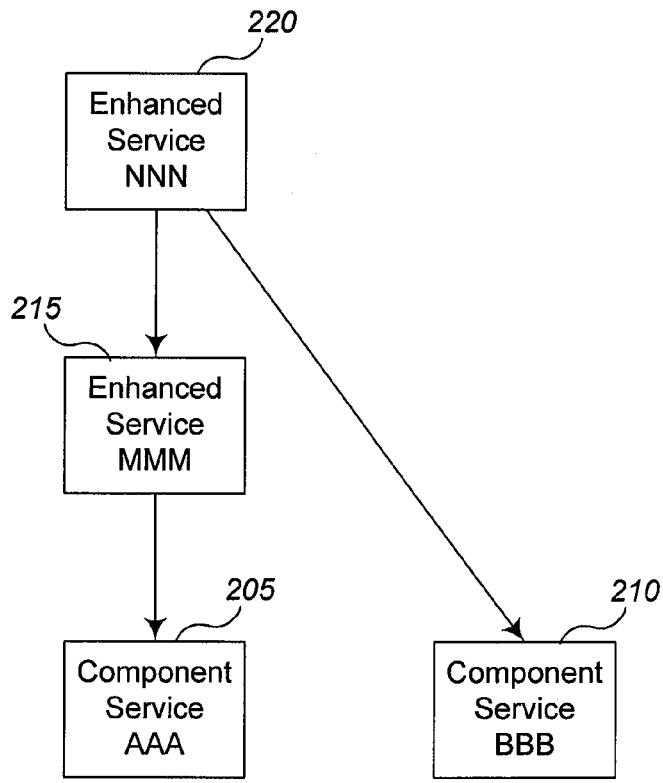

FIG. 2D illustrates another enhanced service that is being configured to use an existing service in the sequence of services, and is thus being added to the sequence. In this example, enhanced service NNN 220 is being added, and it is configured to use two services, those being enhanced service MMM 215 and component service BBB 210. In the illustrated table, rows 226a-b illustrate the two use dimensions for component service AAA 205 and enhanced service MMM 215, and row 226c illustrates the use dimension for component service BBB 210. In the table, column 204 repeats the specified corresponding use prices for component services AAA 205 and BBB 210, and column 214 repeats the specified corresponding configured use prices for enhanced service MMM 215. New column 224 indicates new configured use prices for enhanced service NNN 220 for the three use dimensions, such as to reflect at least part of a configured usage model for enhanced service NNN. In this example, the new configured use price for one of the use dimensions is the same as the prior use price for that dimension.

Figure 2E:
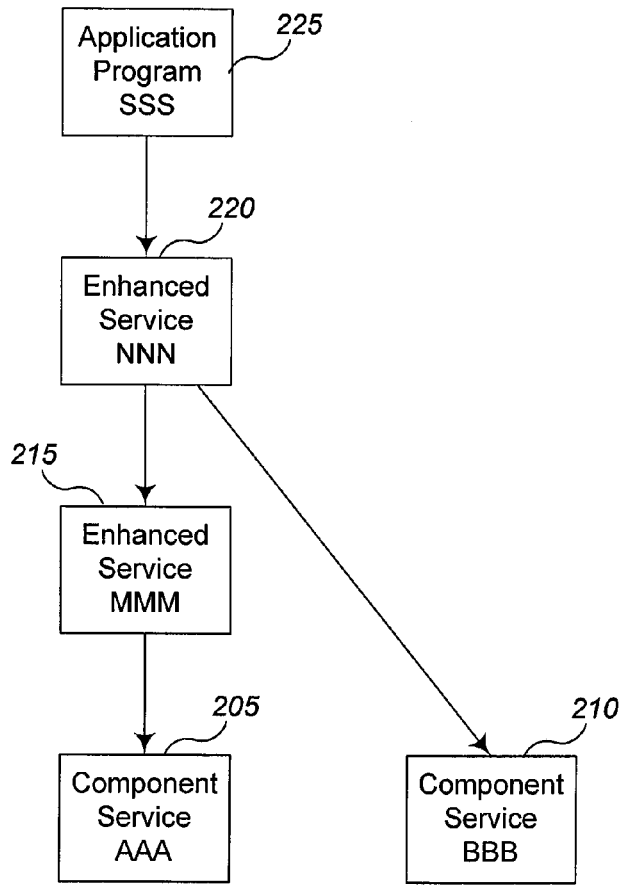

FIG. 2E illustrates an application program SSS 225 that is being configured to use capabilities of enhanced service NNN 220, and thus the capabilities of the sequence of services that includes services 220, 210, 215 and 205. The illustrated table is similar to that previously shown, but with a new column 234 that indicates new configured use prices for use by application SSS 225 of the sequence of services, such as to reflect at least part of a configured usage model for application SSS. In this example, the new configured use price for one of the use dimensions is the same as the prior use price for that dimension.

Figure 2F:
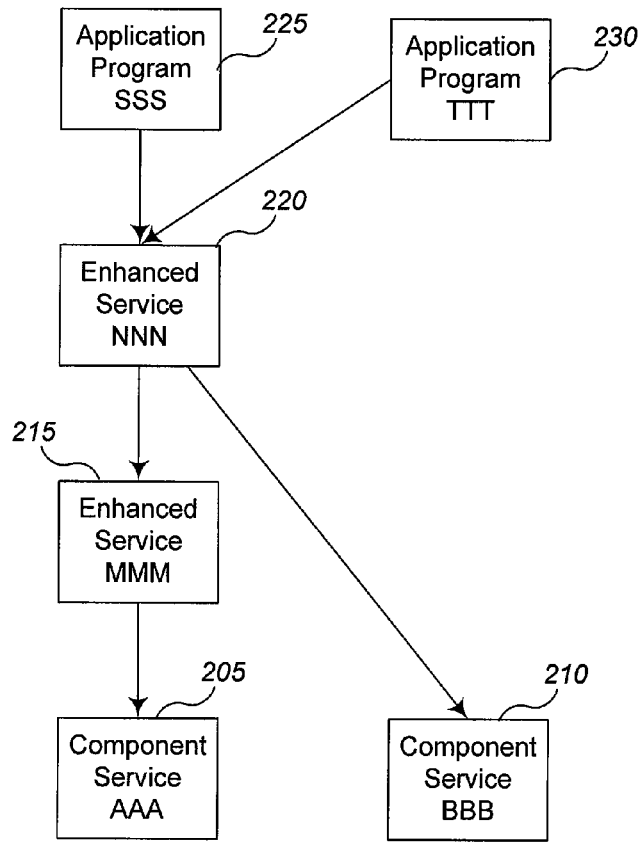

FIG. 2F illustrates a distinct second application program TTT 230 that is also being configured to use capabilities of enhanced service NNN 220, and thus the capabilities of the same sequence of services as application program SSS 225. In this example, while application program TTT 230 uses the same sequence of services as application program SSS 225, application program TTT has configured fees that differ from those of application program SSS. In particular, the illustrated table is similar to that previously shown, but with a new column 244 that indicates new configured use prices for use by application TTT 230 of the sequence of services, such as to reflect at least part of a configured usage model for application TTT. The configured use prices of column 244 differ from the configured use prices of column 234, and column 244 further includes an additional configured use price for a new use dimension shown in row 246d for application TTT 230.

Figure 2G:
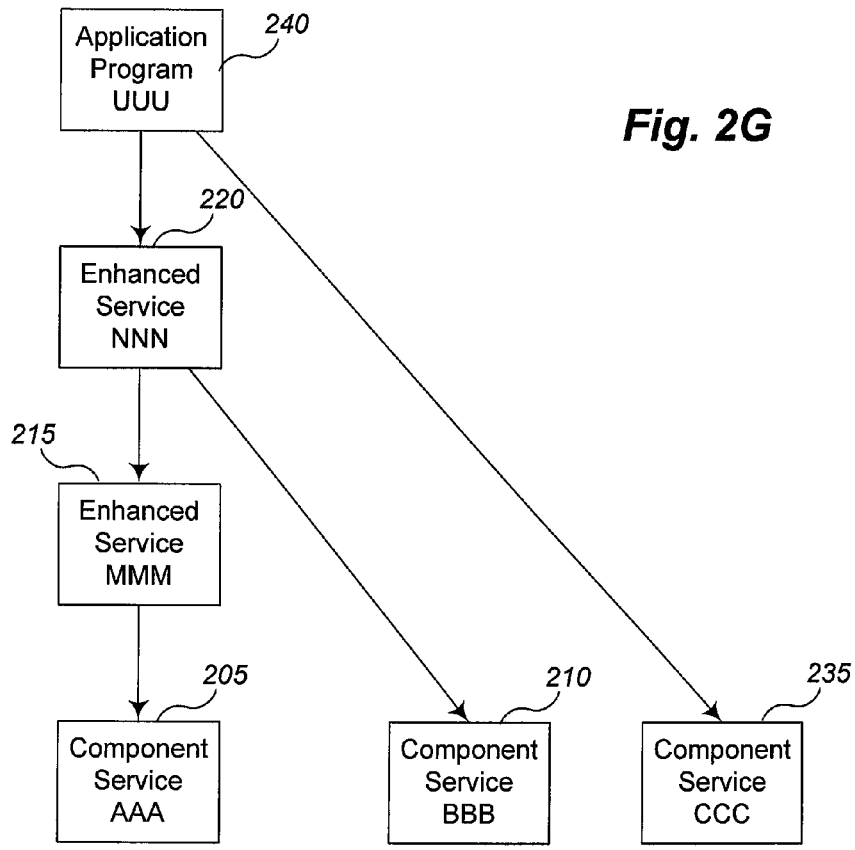

FIG. 2G illustrates a distinct third application program UUU 240 that is also being configured to use capabilities of enhanced service NNN 220 and the following services in the sequence, and further to directly use capabilities of an additional component service CCC 235. In this example, application program UUU has configured prices for the sequence of services that differ from the configured prices of application programs SSS and TTT, and also has an additional configured use price for a new use dimension shown in row 256d that corresponds to component service CCC 235.

Figure 2H:
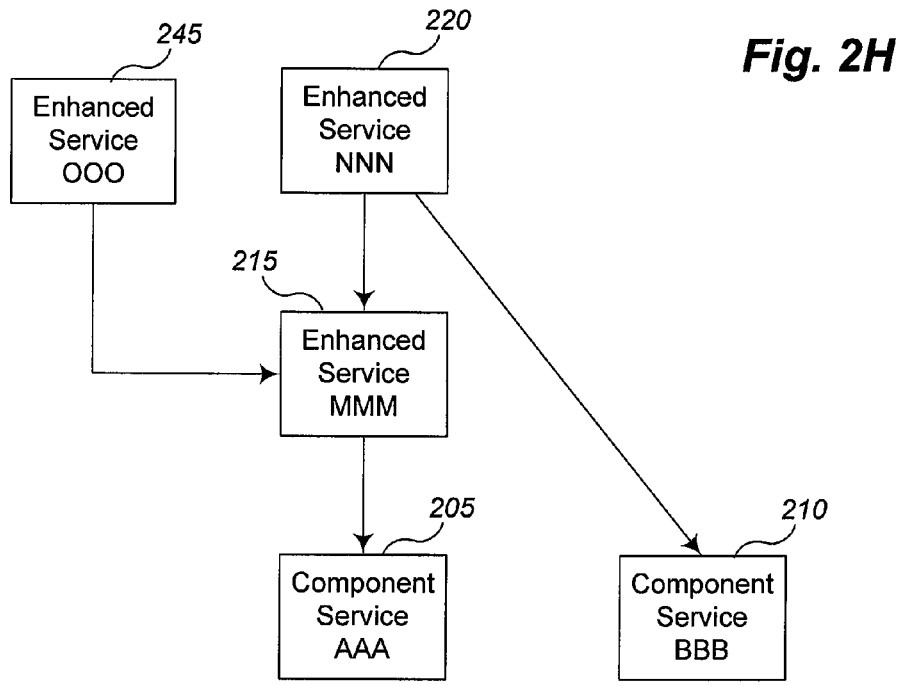

FIG. 2H is similar to FIG. 2D, but illustrates an additional enhanced service that is being configured to also use enhanced service MMM 215 in a manner similar to that of enhanced service NNN 220. In particular, new enhanced service OOO 245 is being added, and thus is the first service in a new sequence that shares a portion of the sequence beginning with enhanced service NNN. The illustrated table in FIG. 2H is similar to the table of FIG. 2D, including rows 266a-c that are similar to rows 226a-c of FIG. 2D (with rows 266a-b illustrating the two use dimensions for component service AAA 205 and enhanced service MMM 215, and row 266c illustrating the use dimension for component service BBB 210 used by enhanced service NNN). The illustrated table in FIG. 2H also has a new row 266d corresponding to a new use dimension that is specified for use with enhanced service OOO. In particular, in this example enhanced service OOO is part of an application that provides digital photo manipulation services, and the new use dimension corresponds to a price per photo manipulated. In the table, column 204 repeats the specified corresponding use prices for component services AAA 205 and BBB 210, column 214 repeats the specified corresponding configured use prices for enhanced service MMM 215, and column 224 repeats the specified corresponding configured use prices for enhanced service NNN 220. New column 264 in the table corresponds to the configured use prices for the new enhanced service OOO, with configured prices being specified for the use dimensions in rows 266a, 266b and 266d (but not 266c, since enhanced service OOO does not use component service BBB 210). In this example, the configured use prices for enhanced service OOO differ from those of enhanced service MMM, the next service in the sequence beginning with enhanced service OOO. In particular, in addition to the price for the new use dimension in row 266d, the configured price for enhanced service OOO for row 266a is less than enhanced service MMM's corresponding configured price, while the configured price for enhanced service OOO for row 266b is significantly more than enhanced service MMM's corresponding configured price. In such a situation in which a new configured use price for enhanced service OOO for one of the use dimensions is less than enhanced service MMM's corresponding configured price, such price configuration may in some embodiments affect enhanced service OOO's liabilities for fees. For example, if enhanced service OOO uses enhanced service MMM on behalf of an end user, but payment is not obtained from the end user for the use, enhanced service OOO may in at least some embodiments continue to be liable for some or all of the fees charged by enhanced service MMM for that use for the use dimension corresponding to row 266a (e.g., for the amount of enhanced service MMM's fees that exceed the corresponding enhanced service OOO's fees based on that use dimension).

Thus, sequences of invocable services may be configured in various ways, and used by various applications in various configurable manners.

FIG. 3 illustrates an example of allocation of fees paid by an end user for use of a sequence of services via an application. In particular, FIG. 3 shows an example of an allocation of fees to be paid by end users for an application that uses one enhanced service, which in turn uses a component storage service. In this example, the component storage service is component service AAA 205 of FIG. 2B, which charges use prices in two separate use dimensions (which in this example are gigabytes ("GB") of data transferred and GB-months of storage used). In the illustrated table of FIG. 3, column 309 illustrates the specified use prices of the component storage service, column 305 illustrates the configured use prices of the enhanced service, and column 301 illustrates the configured use prices paid by an end user of the application for use of the sequence of services via the application. In addition, the table includes columns that illustrate the allocations of proceeds received from the end user, including the application creator's net proceeds 303, the enhanced service provider's net proceeds 307, and the CSSUF system fees 311—the component service's net proceeds are the same as the specified use prices of column 309. Rows 315a-d correspond to the use dimensions for the component service and additional rows for fees (e.g., periodic fees or one-time fees) charged to the end user for use of the enhanced service and the application.

In this example, the entity providing the CSSUF system charges a 10% fee for using the CSSUF system at each level of the sequence of invocations (other than the component service level), although in other embodiments the fees collected may be structured differently (e.g., a single predetermined monetary amount, or a predetermined monetary amount at each level). Therefore, in this example, $0.20 is paid to the CSSUF system for the $2.00 enhanced service fee, with the net proceeds for the enhanced service provider being $1.80 ($2.00 paid by the end user—$0.20 for the CSSUF system fees). Similarly, the CSSUF system receives $0.10 for the $1 program fees, and the application creator user receives $0.90 ($1.00 paid by the end user—$0.10 for the CSSUF system fees).

Similarly, the application provider's net proceeds can be determined by subtracting the configured use price for the first invocable service in the sequence (in this example, the single enhanced service) from the configured use price for the application, and then subtracting the fee owed to the CSSUF system for providing the capabilities. Thus, in this example, the amount in column 305 is subtracted from the amount in column 301, which for row 315a is $2.00-$1.00, or $1.00. The CSSUF subsequently takes its cut of 10%, or $0.10, leaving net proceeds of $0.90 for the application creator. Similarly, this computation is repeated for each level of the sequence (except for the component service) to determine the net proceeds at each level. Therefore, in this example, to calculate the enhanced service provider's net proceeds, the amount in column 309 is subtracted from the amount in column 305, which for row 315a is $1.00-$0.15 or $0.85, and the 10% fee to the CSSUF is 8.5 cents. Accordingly, the enhanced service provider receives net proceeds of $0.765. However, in this example, the amount of the proceeds is rounded down to the nearest cent in this table. Similar calculations will provide the example values in row 315b of the table.

Thus, fees to be paid by end users for use of sequences of services via applications may be determined and allocated between application providers and service providers based on configured usage models in a variety of ways.

Figure 4:
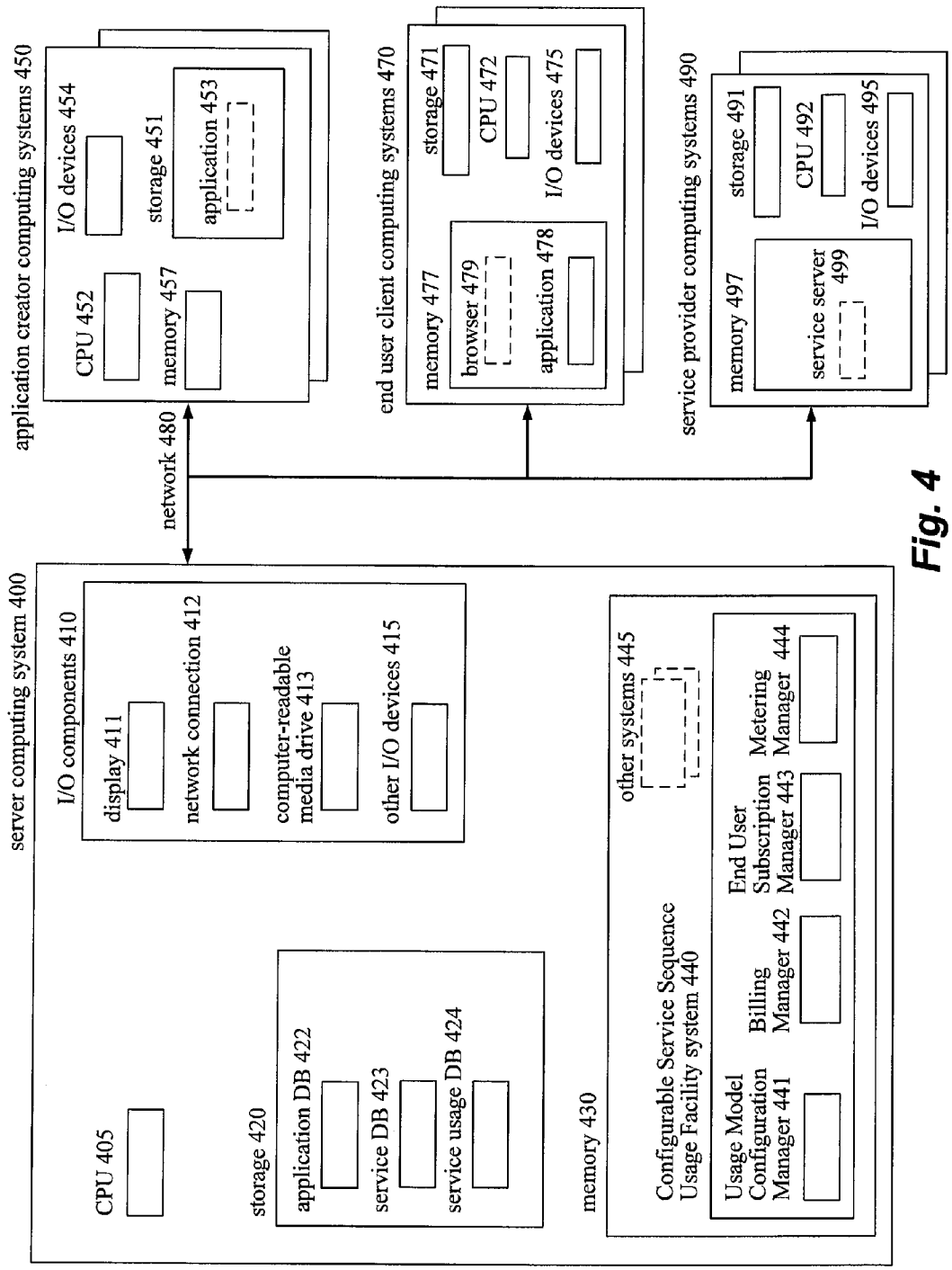
FIG. 4 is a block diagram illustrating a computing system suitable for executing an example embodiment of a system for facilitating use of sequences of invocable fee-based services by applications.

FIG. 4 illustrates a server computing system 400 suitable for executing an embodiment of the Configurable Service Sequence Usage Facility ("CSSUF") system, as well as various other computing systems. In this example, the other computing systems include one or more application creator computing systems 450, one or more end user client computing systems 470, and one or more service provider computing systems 490. In the illustrated embodiment, the server computing system 400 includes a CPU 405, various I/O components 410, storage 420, and memory 430. The I/O components include a display 411, a network connection 412, a computer-readable media drive 413, and other I/O devices 415 (e.g., a keyboard, a mouse, speakers, etc.).

An embodiment of the CSSUF system 440 is executing in memory 430, and it interacts with the other computing systems over the network 480 (e.g., via the Internet and/or the World Wide Web, via a private cellular network, etc.). The other computing systems may similarly execute various software as part of the interactions. For example, a Web browser 479 executing in memory 477 of an end user client computing system allows end users to interact with the CSSUF system (e.g., to subscribe to an application, to monitor use of invocable services by one or more applications on behalf of the end user and corresponding fees for the end user, etc.). Furthermore, a service server 499 may execute in memory 497 of a service provider computing system in order to provide an invocable service that is registered with the CSSUF system, and directly or indirectly used by one or more applications. The service provider computing systems may in some embodiments similarly include executing software (e.g., a Web browser) to allow service provider users to interact with the CSSUF system, such as to specify configured usage models for their services (e.g., based on the use of one or more other invocable services), to monitor use of their services and corresponding proceeds, etc.

In this illustrated embodiment, an application creator user creates an application 453 that is stored on storage 451 of an application creator computing system, and that is configured to use one or more selected invocable services (e.g., a sequence of multiple services) via the CSSUF system that are provided by one or more service provider computing systems. The application creator computing systems may in some embodiments similarly include executing software (e.g., a Web browser) to allow application creator users to interact with the CSSUF system, such as to specify configured usage models for the applications (e.g., based on the use of one or more invocable services, such as a sequence of services), to monitor use of their applications and corresponding proceeds, etc. One or more end users may then obtain a copy of the application 451, such as based on interactions with the application creator computing system, and execute the application copy in memory 477 of the end user computing systems (e.g., to provide various functionality via the selected enhanced services) after the end user has completed a corresponding subscription process via the CSSUF system.

The illustrated embodiment of the CSSUF system includes a Usage Model Configuration Manager component 441, a Billing Manager component 442, an End User Subscription Manager component 443, and a Metering Manager component 444. As described in greater detail with respect to FIG. 5 and elsewhere, the Usage Model Configuration Manager component facilitates configuration of usage models for services and applications. As described in greater detail with respect to FIG. 5 and elsewhere, the End User Subscription Manager component facilitates end user subscriptions to use of invocable services via applications. As described in greater detail with respect to FIG. 7 and elsewhere, the Metering Manager component facilitates tracking use of services by applications and on behalf of end users. As described in greater detail with respect to FIG. 8 and elsewhere, the Billing Manager component facilitates obtaining fees from end users and allocating payments to service providers and application creators. In the illustrated embodiment, a variety of database ("DB") data structures 422, 423, and 424 are present on the storage 430 for use by the CSSUF system, such as to store information about applications and their configured usage models, about invocable services and their associated usage models, and about tracked usage of services by applications and on behalf of end users, although in other embodiments some or all such databases may instead be located elsewhere and/or be organized in other manners. In addition, one or more other optional systems 445 may also be executing on the server computing system, such as an electronic marketplace system for invocable services.

It will be appreciated that the illustrated computing systems are merely illustrative and are not intended to limit the scope of the present invention. The computing systems 400, 450, 470, and 490 may instead each include multiple interacting computing systems or devices, and those computing systems may be connected to other devices that are not illustrated, including through one or more networks such as the Internet, via the "Web", or via private networks (e.g., mobile communication networks, etc.). More generally, a server or client computing system or device may comprise any combination of hardware or software that can interact, including (without limitation) desktop or other computers, network devices, PDAs ("Personal Digital Assistants"), cellphones, wireless phones, pagers, electronic organizers, Internet appliances, television-based systems (e.g., using set-top boxes and/or personal/digital video recorders), and various other consumer products that include appropriate inter-communication capabilities. In addition, in some embodiments at least some of the described functionality may instead not be provided as part of an embodiment of the CSSUF system and/or other additional functionality may be available.

It will also be appreciated that, while various items are discussed or illustrated as being stored in memory or on storage while being used, these items or portions of them may be transferred between memory and other storage devices for purposes of memory management and data integrity. Alternatively, in other embodiments some or all of the software systems may execute in memory on another device and communicate with the illustrated computing system via inter-computer communication. Some or all of the systems and/or data structures may also be stored (e.g., as software instructions or structured data) on a computer-readable medium, such as a hard disk, memory, a network, or a portable media article (e.g., a DVD or a flash memory device) to be read by an appropriate drive or via an appropriate connection. The systems and data structures may also be transmitted via generated data signals (e.g., by being encoded in a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 5:
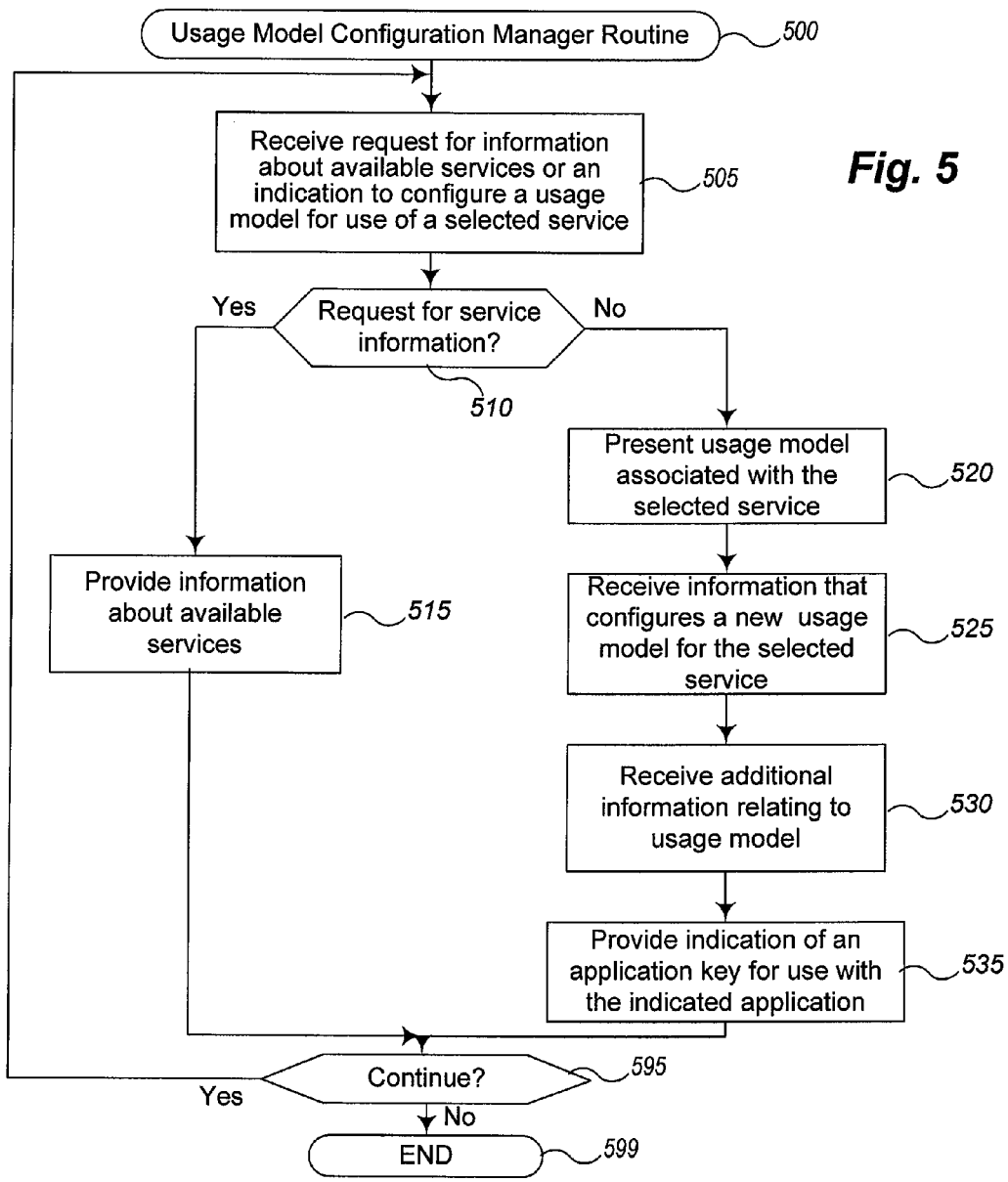
FIG. 5 is a flow diagram of an example embodiment of a Usage Model Configuration Manager routine.

FIG. 5 is a flow diagram of an example embodiment of a Usage Model Configuration Manager routine 500. The routine may, for example, be provided by execution of the Usage Model Configuration Manager component 441 of FIG. 4, such as to allow service provider users and application creator users to configure usage models for their invocable services or their applications. In this illustrated example, the usage model configuration is performed in an interactive manner, although in other embodiments it may be performed in other manners, such as programmatically. Furthermore, although the routine illustrates only a usage model based on use of a single selected invocable service, usage models may be configured in a similar manner for each of multiple selected services to be used.

The routine begins at step 505, where the routine receives a request for information about available services or an indication to configure a usage model for an application or enhanced service based on use of a selected service. While not illustrated here, in some embodiments this or a related routine may similarly allow specification of associated usage models for component services. After receiving the request, the routine proceeds to step 510, where the routine determines if the request was for service information. If so, the routine continues to step 515, and if not proceeds to step 520. At step 515, the routine provides information about available services, and then continues to step 595. The information may include, for example, the name of the service, a description of the service, ratings for the service, the associated usage model for the service, and any component services used by the application.

At step 520, the routine initiates the configuring of the usage model based on the selected service by presenting the usage model associated with the selected service, such as by displaying information about the usage model on a Web page. After presenting the usage model information associated with the selected service, the routine receives information in step 525 that specifies a new configured usage model for the selected service, such as by indicating one or more configured use prices for indicated amounts of use with respect to indicated use dimensions. In some embodiments, the CSSUF system may assist the user by suggesting various information for the configured usage model, such as one or more suggested configured use prices. After receiving the configured usage model information, the routine proceeds to step 530, where additional information for the usage model may optionally be received from the user and/or CSSUF system for use as part of the configured usage model. A variety of types of additional information may be specified in various embodiments, including timing for obtaining payments (e.g., billing date, billing cycle), promotions, discounts to be provided via discount coupons to be used, etc. After receiving any additional information relating to the configured usage model, the routine continues to step 535 to store the configured usage model information and to provide an indication of an application key for later use with the indicated application or enhanced service. In some embodiments, the routine may provide additional information to the user, such as information for application creator users to direct end users of the application to the CSSUF system for subscription.

After steps 515 or 535, the routine continues to step 595 to determine whether to continue. If so, the routine returns to step 505, and if not continues to step 599 and ends.

Figure 6:
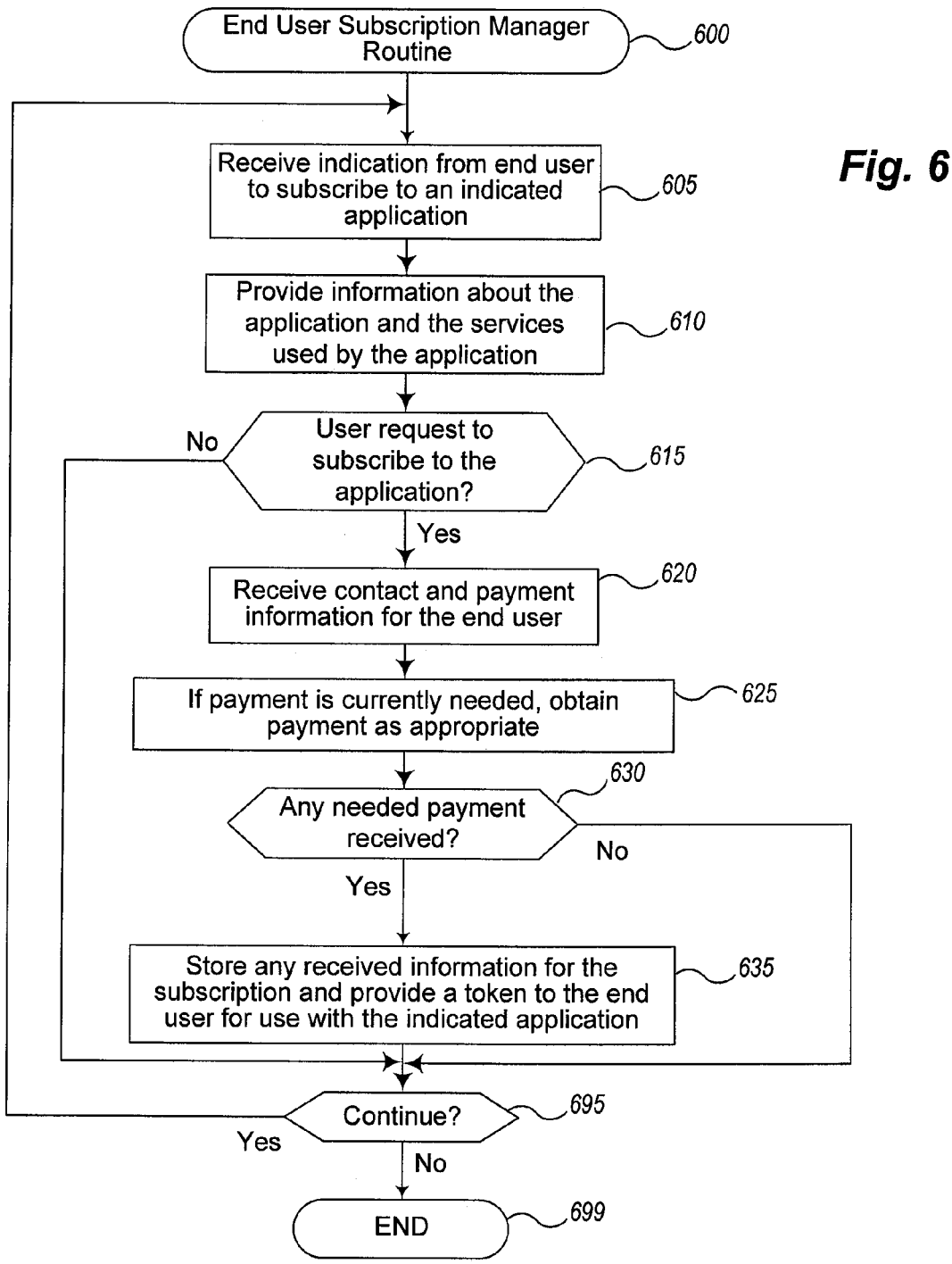
FIG. 6 is a flow diagram of an example embodiment of an End User Subscription Manager routine.

FIG. 6 is a flow diagram of an example embodiment of an End User Subscription Manager routine 600. The routine may, for example, be provided by execution of the End User Subscription Manager component 443 of FIG. 4, such as to subscribe end users for use of indicated applications. While in the illustrated embodiment the routine creates subscriptions for end users to enable use of indicated applications, in other embodiments the routine may provide access to indicated applications for end users in other manners.

The routine begins at step 605, where an indication is received from an end user to initiate subscription to an indicated application. The routine then continues to step 610 to display information to the end user about the indicated application and one or more invocable services used via the application, although in other embodiments some or all of that information may instead not be provided or may be provided in other manners (e.g., already have been displayed to the end user by the application creator, such as on a Web site associated with the application creator). The displayed information may include information about the one or more configured usage models for the indicated application that correspond to one or more invocable services used by the application, a description of the application, etc.

After displaying the information to the end user, the routine proceeds to step 615, where the routine determines if the end user has decided to request a subscription to the indicated application. If so, the routine continues to step 620, and if not proceeds to step 695. At step 620, the routine receives contact and payment information about the end user. In at least some embodiments, the information may be retrieved from an existing account at an associated system if such an account is available. After receiving contact and payment information, the routine proceeds to step 625 to determine whether the subscription to the application has an initial upfront fee (e.g., a one-time setup fee, the first month of a recurring monthly fee, etc.), and if so to attempt to obtain payment for the fee. If it is determined in step 630 that payment is obtained or if no payment is currently needed, the routine proceeds to step 635 to create the subscription and store related information. In addition, in the illustrated embodiment, the routine provides a user token to the end user for use in configuring a copy of the application for use by the end user. In some embodiments, additional functionality (not shown) may be provided, such as to redirect the end user to a Web page from which the end user may download or initiate use of the application. After step 635, the routine continues to step 695. Alternatively, if payment was needed but not received in step 625, then the routine proceeds from step 630 to step 695 without creating the subscription for the end user. In other embodiments, the routine may instead proceed in other manners, such as to create a subscription for the end user even if the needed payment was not received (or if a determination as to whether the needed payment has been received may not be available until a later time), but to later fail to authenticate access requests if payment is still not received at that time. At step 695, the routine determines whether to continue. If so, the routine returns to step 605, and if not ends at step 699.

Figure 7:
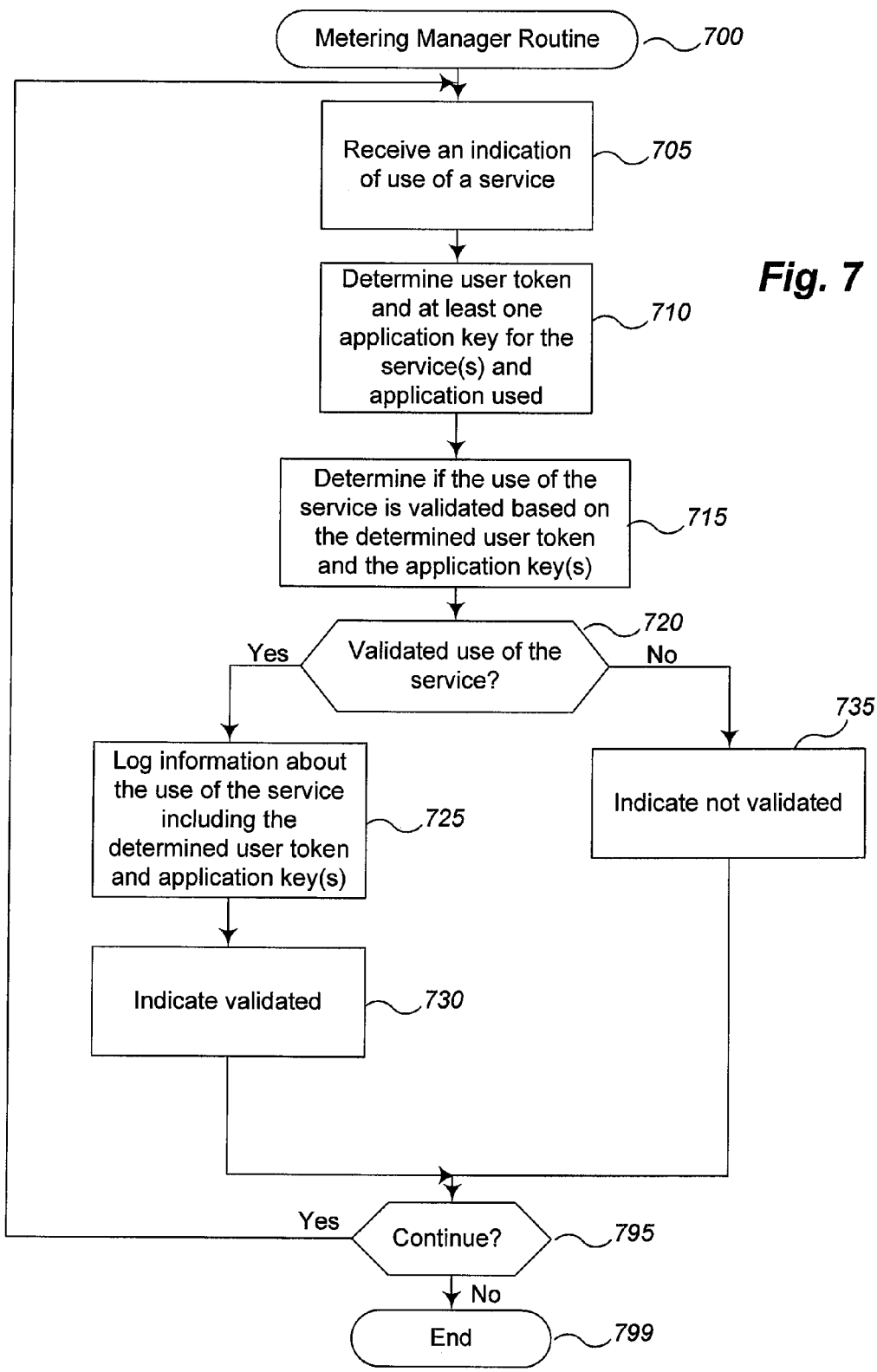
FIG. 7 is a flow diagram of an example embodiment of a Metering Manager routine.

FIG. 7 is a flow diagram of an example embodiment of a Metering Manager routine 700. The routine may, for example, be provided by execution of the Metering Manager component 444 of FIG. 4, such as to receive and track information about use of invocable services by applications and on behalf of end users. In the illustrated embodiment, the tracking of information about service use is performed in a manner related to authentication functionality of the CSSUF system, such as to receive an indication of potential service use (e.g., as part of an access request) and provide an indication of whether the potential service use is authorized. In other embodiments, the tracking of information about service use may instead be performed at other times, such as after the service use has begun or has been completed.

The routine begins at step 705, where an indication is received of use of an invocable service. As previously noted, an indication of service use may be received by the CSSUF system in various ways in various embodiments. After receiving the indication, the routine continues to step 710, where the routine determines a user token and at least one application key corresponding to the application that initiated the use of the invocable service on behalf of an end user. In some embodiments, multiple application keys corresponding to the application and some or all of the services in the sequence prior to the invocable service are received, while in other embodiments a single application key (e.g., an application key for the application used by the end user, an application key for a last component service in the sequence, etc.) is received and the other related application keys are determined based on that application key and/or other received information (e.g., the user token, such as if it is associated with a particular application). Similarly, the end user token may be received or may be determined based on other user information received (e.g., a user credential received in response to previously authenticating the user token). After determining the user token and at least one application key, the routine proceeds to step 715 to determine if use of the service is validated based on the determined user token and the application key(s), such as based on the relevant configured usage models and any related user subscriptions. Subsequently, in step 720, the routine determines whether the use of the service is validated, and continues to step 735 if not and to step 725 if so. In step 735, the routine indicates that the use of the service is not validated. As a result, in at least some of the embodiments, an error message is indicated to the enhanced service and/or the application.

If instead the routine determines that the use of the service is validated, the routine continues to step 725 to log information about the use of the service, including the determined user token and application key(s). The information may be logged, for example, in the service usage DB 424 of FIG. 4. After logging the information, the routine continues to step 730 to indicate that the use of the service is validated. As a result of the indication, the service may proceed to perform the capabilities of the invocable service. After steps 730 or 735, the routine proceeds to step 795 to determine whether to continue. If so, the routine returns to step 705, and if not ends at 799.

Figure 8:
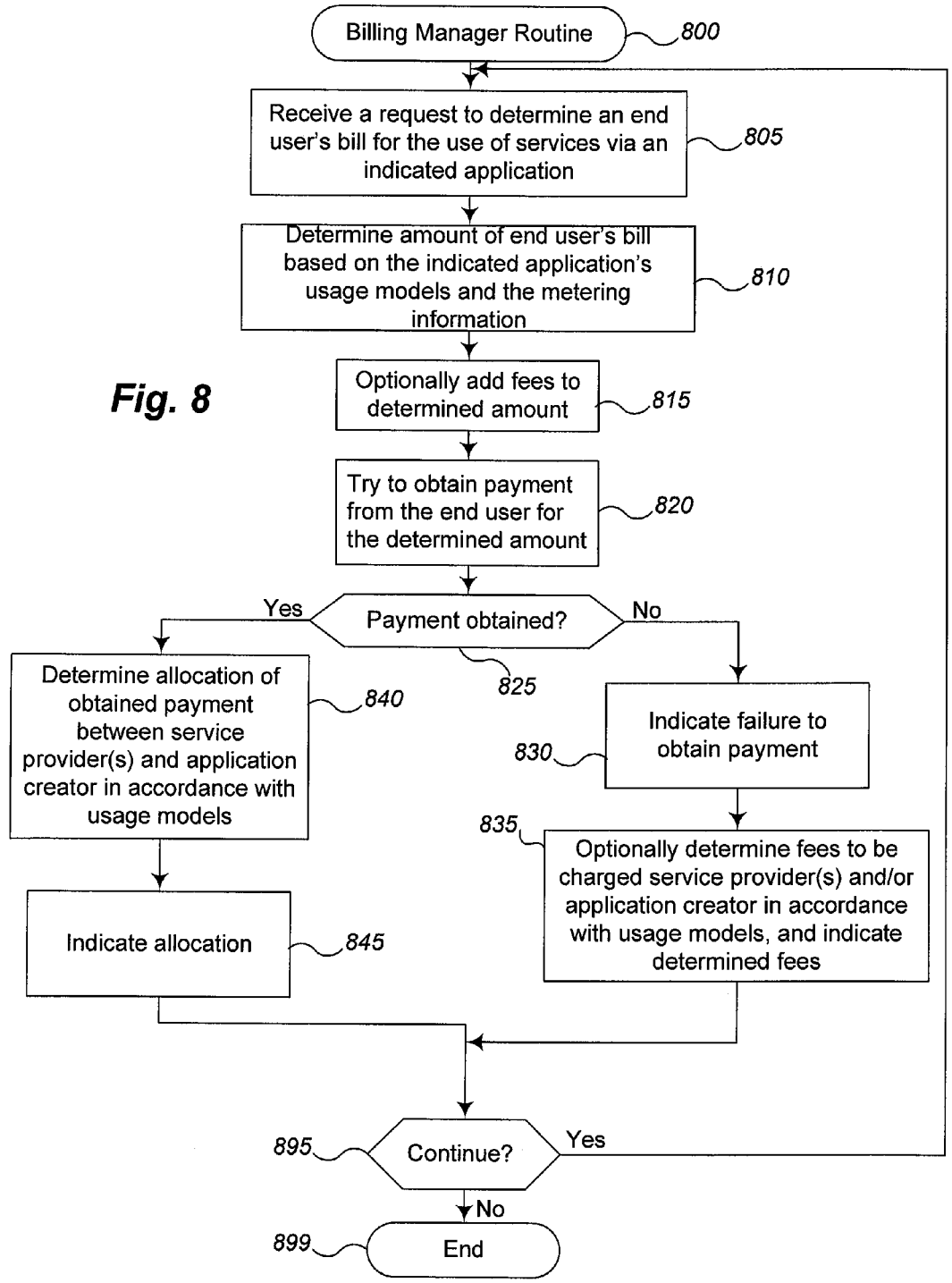
FIG. 8 is a flow diagram of an example embodiment of a Billing Manager routine.

FIG. 8 is a flow diagram of an example embodiment of a Billing Manager routine 800. The routine may, for example, be provided by execution of the Billing Manager component 442 of FIG. 4, such as to determine fees to be paid by the end user for use of invocable services via an application, and to allocate any received fees between the application creator for the application and the various service providers of the invocable services. In other embodiments, the determination of end user fees and allocate of fees may be performed at different times and/or by different routines. In addition, while the illustrated routine determines an end user's fees based on use of a single application, in other embodiments the fees for the use of all applications by an end user may be determined.

The routine begins at step 805, where a request is received to determine an end user's bill for the use of invocable services via an indicated application. The request may be initiated in various ways, such as by the user, automatically on a periodic basis (e.g., monthly), etc. After receiving the request, the routine proceeds to step 810, where the routine determines the amount of fees to charge the end user for a particular use or amount of use (e.g., use during a prior month) based on the configured usage model associated with the indicated application and tracked information regarding the service use (e.g., as collected in the Metering Manager routine illustrated in FIG. 7). Once the amount of the end user's fees based on service use are determined, the routine continues to step 815 to optionally add any additional fees (e.g., monthly fees for the indicated application and/or one of the enhanced services used by the application) to the determined amount. After optionally adding the fees, the routine in step 820 attempts to obtain payment from the end user for the determined amount. For example, payment may be obtained automatically by using previously obtained payment information, and in some embodiments at least some of the determined fees may have already been paid (e.g., if recurring monthly fees are charged in advance for the upcoming month). Next, the routine proceeds to step 825 to determine if payment was obtained. If so, the routine continues to step 835, and if not proceeds to step 830 to indicate failure to obtain payment. After indicating the failure to obtain payment in step 830, various additional actions may be performed in various embodiments. For example, while not illustrated here, attempts may be made to contact the end user to obtain alternative payment information, a subscription of the end user may be canceled (e.g., by revoking validity of a user token provided to the user, such that future access requests will be treated as not being authorized), etc. In the illustrated embodiment, the routine continues to step 835 to optionally determine and indicate fees to be charged service providers and/or the application creator for use of other services, such as for situations in which liability is not removed. After step 835, the routine continues to step 895.

If payment is obtained in step 820, the routine continues to step 840 to determine the allocation of the payment between the application creator for the indicated application and the service providers for the invocable services used by the application, based on the various configured usage models for the application and the invocable services. In step 845, the determined allocation is then indicated, and in some embodiments the payments to the application creator and the various service providers may be made. If not, payment may be made in other manners and/or at other times as appropriate. As previously mentioned, in some embodiments, the allocation of received payment may also in some embodiments provide at least some of the collected fees to the entity providing the CSSUF system.

After step 845 or step 835, the routine continues to step 895 to determine whether to continue. If so, the routine returns to step 805, and if not ends at step 899.

Various additional functionality may be provided in various embodiments of the CSSUF system. For example, in at least some embodiments, the entity providing the CSSUF system and/or third-party service providers may set various criteria to be met by configured usage models for some or all services and/or applications, such as by indicating a minimum configured use price (e.g., a configured use price that exceeds the use price of an invocable service being used by a predetermined amount) and/or a maximum configured use price. The CSSUF system may further enforce the criteria when configured usage models are created. As a second example, in some embodiments one or more related individuals may be associated with a single user token. For example, if a copy of an application is used by an entity rather than an individual, multiple individuals may be authorized to use a single end user token for a specified application copy. Furthermore, in some embodiments a received application key may be associated with a particular configured usage model for the application, such that, if the application has multiple configured usage models for multiple distinct invocable services or service sequences, a distinct application key is issued for each configured usage model.

In addition, in some embodiments configured use prices may have other forms, such as tiered use prices. For instance, tiered use prices may be used to provide volume discounts to high-volume users of an application. When tiered use prices are used, they may be specified in various manners. For example, information may be specified regarding how a tier-based usage model is structured, such as the start and end of various tiers (e.g., in units of the use price for the service, or in terms of conditions such as times for peak/off-peak pricing), whether the tiers are cumulative, etc. Additionally, in at least some embodiments, a service provider may offer discounted usage models when another service from that provider is also used.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving one or more indications of one or more uses by an application of a sequence of multiple distinct network-accessible services on behalf of an end user of the application,
wherein each of the uses by the application of the sequence includes the application invoking a first service in the sequence and supplying to the first service an application key specific to the application as part of the invoking,
wherein each service in the sequence other than a last service in the sequence is configured to invoke a next service in the sequence on behalf of the application by further supplying the application key to that next service, and
wherein the receiving of the one or more indications is performed by one or more configured computing systems that provide a metering service to track fee-based use of network-accessible services;
tracking the one or more uses by the application of the sequence of multiple services on behalf of the end user based at least in part on the application key supplied by the application to the first service as part of the invoking of the first service by the application for each of the uses, the tracking being performed by the one or more configured computing systems; and automatically determining fees associated with the tracked one or more uses of the sequence of multiple services by the application on behalf of the end user, wherein the application has an associated configured usage model for use in determining fees for use of the sequence of multiple services, wherein one or more of the multiple network-accessible services of the sequence each has an associated configured usage model for use in determining fees for use of the service, wherein the determined fees include a first fee that is based at least in part on the configured usage model associated with the application and one or more other fees based at least in part on the configured usage models associated with the one or more services of the sequence, wherein the first fee is to be charged to the end user, and wherein the one or more other fees are to be paid to one or more providers of the one or more services of the sequence for the tracked one or more uses of the sequence of multiple services, and wherein the automatic determining is performed by the one or more configured computing systems.

2. The method of claim 1 wherein the sequence of multiple network-accessible services includes at least one intermediate network-accessible service that is invoked in the sequence after the first service and before the last service.

3. The method of claim 2 wherein the first service in the sequence and the at least one intermediate services in the sequence are each provided by one of multiple network-accessible third-party applications that are unrelated to the application other than via the use by the application of the sequence of multiple services.

4. The method of claim 3 wherein the last service in the sequence is a component network-accessible service that is made available for use by third-party applications over a network, and wherein each of the other services in the sequence is an enhanced service that is made available for use by third-party applications over the network.

5. The method of claim 4 wherein the application is an application program, and wherein the use of the sequence of multiple services by the application is performed by a copy of the application program that is executing on a computing device of the end user.

6. The method of claim 1 wherein, for one of the indicated uses by the application of the sequence of services, after the application invokes the first service, the first service provides a response to the application without invoking a next service in the sequence, such that the services of the sequence other than the first service are not invoked as part of the one use.

7. The method of claim 6 wherein the automatic determining of the fees associated with the one use by the application of the sequence of service includes determining the first fee for the one use and determining one other fee for the one use that is based at least in part on the configured usage model for the first service, the determined first fee to be charged the end user for the one use by the application and the determined one other fee to be paid to a provider of the first service for the one use.

8. The method of claim 7 wherein the automatic determining of the fees associated with the one use by the application of the sequence of service includes not determining any fees for the one use for any services of the sequence other than the first sequence so as to reflect that the services of the sequence other than the first service are not invoked as part of the one use.

9. The method of claim 1 wherein, for one of the indicated uses by the application of the sequence of services, after the application invokes the first service, each service in the sequence other than the last service invokes the next service in the sequence, such that all of the services of the sequence are invoked as part of the one use.

10. The method of claim 9 wherein the automatic determining of the fees associated with the one use by the application of the sequence of service includes determining the first fee for the one use and determining multiple other fees for the one use such that the determined other fees include a determined fee for each of the services of the sequence based on the configured usage model for that service, the determined first fee to be charged the end user for the one use by the application and each of the determined other fees for a service of the sequence to be paid to a provider of that service for the one use.

11. The method of claim 1 wherein, for one of the indicated uses by the application of the sequence of services, after the application invokes the first service, the first service invokes a next service in the sequence but a service in the sequence prior to the last service does not invoke the last service, such that a subset of the services of the sequence are invoked as part of the one use.

12. The method of claim 1 further comprising providing indications of the determined first fee for use in obtaining payment from the end user and of the determined one or more other fees for use in providing compensation to one or more providers of the one or more services of the sequence.

13. The method of claim 12 wherein the providing of the indications of the one or more other fees includes providing payment of the one or more other fees to the one or more providers of the one or more services of the sequence in a manner that is based at least in part on obtaining payment for the first fee from the end user.

14. The method of claim 12 wherein the providing of the indications of the first fee includes billing the end user for the first fee.

15. The method of claim 1 wherein each of the multiple services of the sequence has an associated usage model for use in determining fees for use of the service by others, and wherein the automatic determining of the fees associated with the use of the sequence of multiple services includes, for each of the multiple services of the sequence, determining a fee for use of the service based at least in part on the associated usage model of the service.

16. The method of claim 15 wherein, for each of the multiple services of the sequence other than the last service, the associated usage model for the service is based in part on the associated usage model for the next service in the sequence, such that the determined fee for use of each of the multiple services of the sequence other than the last service includes the determined fees for use of later services of the sequence.

17. The method of claim 16 wherein the configured usage model associated with the application is based in part on the associated usage model for the first service in the sequence, such that the determined first fee includes the determined fees for use of the multiple services of the sequence.

18. The method of claim 17 wherein the determining of the fees for use of the multiple services of the sequence is performed in such a manner as to remove liability for the determined fees from the application and the multiple services of the sequence, so that no fees are owed by the application and the multiple services of the sequence if payment is not obtained from the end user for the first fee.

19. The method of claim 15 wherein, for each of the multiple services of the sequence other than the last service, the determined fee for use of the service is greater than the determined fee for use of the next service of the sequence.

20. The method of claim 15 wherein the determined fees for the multiple services of the sequence include the one or more other fees.

21. The method of claim 15 wherein each of the associated usage models includes an indicated price for an indicated amount of use with respect to an indicated use dimension, and wherein the associated usage models for the multiple services of the sequence are distinct.

22. The method of claim 1 wherein each configured usage model includes an indicated price for an indicated amount of use with respect to an indicated use dimension, and wherein the configured usage models for the application and the one or more services are each distinct.

23. The method of claim 1 wherein the associated configured usage model for the application is defined by a provider of the application before the receiving of the indication of the use by the application of the sequence of the multiple services on behalf of the end user.

24. The method of claim 23 further comprising, before the receiving of the indication of the use by the application of the sequence of the multiple services on behalf of the end user, receiving payment information from the end user for use in providing payment for the determined first fee.

25. The method of claim 1 wherein the determined one or more other fees includes a determined second fee to be paid for use of the first service of the sequence, the determined second fee for use of the first service including fees for all other of the multiple services of the sequence that have fees for use.

26. The method of claim 25 wherein the automatic determining of the fees associated with the use of the sequence of multiple services by the application includes determining a third fee to be provided to a provider of the application, the determined third fee being based at least in part on a difference between the determined first and second fees.

27. The method of claim 26 further comprising providing payment of the determined third fee to the provider of the application in a manner that is based at least in part on obtaining payment for the first fee from the end user.

28. The method of claim 1 wherein the metering service is a fee-based service, and wherein the method further comprises obtaining a fee for performing the tracking of the one or more uses of the sequence of multiple services by the application on behalf of the end user.

29. The method of claim 1 wherein each received indication of one of the one or more uses by the application of the sequence of multiple services on behalf of the end user includes receiving the application key specific to the application, the application key being associated with the application, and wherein the tracking of each use by the application of the sequence of multiple services on behalf of the end user is based at least in part on the received application key for the use.

30. The method of claim 29 wherein the application key is received from the application as part of a request for access to the first service, and further comprising determining whether the access to the first service is authorized.

31. The method of claim 29 wherein the application key is received from the last service.

32. The method of claim 29 wherein each received indication of a use by the application of the sequence of multiple services on behalf of the end user includes receiving user information based on a user token that is associated with the end user, and wherein the tracking of each use by the application of the sequence of multiple services on behalf of the end user is further based at least in part on the received user information for the use.

33. The method of claim 1 further comprising receiving indications of multiple uses by multiple applications of multiple sequences of services on behalf of multiple end users, and wherein the tracking and the automatic determining of fees is performed for the multiple uses.

34. The method of claim 33 wherein a first of the multiple sequences of services and a second of the multiple sequences of services each includes a common subset of one or more services and each includes one or more distinct services that are not included in the other sequence.

35. The method of claim 33 wherein the configured usage model associated with the application is for use in determining fees for end users of the application for use of the sequence of multiple services, wherein a second application further uses the sequence of the multiple services on behalf of an end user of the second application, and wherein the second application has a distinct associated configured usage model for use in determining fees for end users of the second application for use of the sequence of multiple services, such that the determined fees for the end users of the second application for use of the sequence of multiple services differ from the determined fees for the end users of the application for use of the sequence of multiple services.

36. The method of claim 1 wherein at least one of the multiple services of the sequence other than the last service further invokes at least one other network-accessible service that is not part of the sequence of the multiple services.

37. The method of claim 1 wherein the multiple services of the sequence are Web services provided by multiple distinct providers.

38. A non-transitory computer-readable medium whose contents program a computing system of a metering service to perform a method, the method comprising:
 receiving, by the configured computing system, an indication of a use by an application of a sequence of multiple network-accessible services on behalf of an end user of the application,
  wherein the use by the application of the sequence includes the application invoking a first service in the sequence and supplying to the first service an application key specific to the application, and
  wherein each service in the sequence other than a last service in the sequence is configured to invoke a next service in the sequence on behalf of the application by further supplying the application key to that next service;
 tracking, by the configured computing system, the use by the application of the sequence of multiple services based at least in part on the application key supplied by the application to the first service; and
 automatically determining, by the configured computing system, fees associated with the tracked use of the sequence of multiple services by the application,
  wherein the application has an associated configured usage model related to use of the sequence of multiple services,
  wherein one or more of the multiple network-accessible services of the sequence each has an associated configured usage model related to use of the service, and
  wherein the determined fees include a first fee that is based at least in part on the configured usage model associated with the application and one or more other fees based at least in part on the configured usage models associated with the one or more services of the sequence.

39. The non-transitory computer-readable medium of claim 38 wherein the associated configured usage model for the application is defined by a provider of the application and includes an indicated price that corresponds to an indicated amount of use of the sequence of multiple services, and wherein the method further comprises obtaining payment from the end user for the determined first fee and providing compensation to one or more other providers of the one or more services of the sequence based at least in part on the determined one or more other fees.

40. The non-transitory computer-readable medium of claim 38 wherein the received indication of the use by the application of the sequence of multiple services on behalf of the end user includes receiving the application key for the use, the application key being an alphanumeric string specific to the application and being received by the metering service from at least one of the application and of one or more of the multiple services of the sequence to enable the metering service to track fee-based use of network-accessible services by each of multiple applications having distinct application keys, and wherein the tracking of the use by the application of the sequence of multiple services is based at least in part on the received application key for the use.

41. The non-transitory computer-readable medium of claim 38 wherein, after the application invokes the first service, the first service provides a response to the application without invoking a next service in the sequence, such that the services of the sequence other than the first service are not invoked as part of the use.

42. The non-transitory computer-readable medium of claim 38 wherein the computer-readable medium is a memory of the configured computing system, and wherein the contents are executable software instructions.

43. A computing system configured to provide a metering service that tracks fee-based use of network-accessible services, comprising:
  one or more processors; and
  a system that is programmed to, when executed by the one or more processors, provide a metering service, the providing of the metering service including:
    receiving an indication of a use by an application of a sequence of multiple network-accessible services, wherein the use by the application of the sequence includes the application invoking a first of the multiple services of the sequence and supplying to the first service an application key specific to the application as part of the invoking, and
    wherein each service in the sequence other than a last service in the sequence is configured to invoke a next service in the sequence on behalf of the application by further supplying the application key to that next service;
    tracking the use by the application of the sequence of multiple services based at least in part on the application key supplied by the application to the first service; and
    automatically determining fees associated with the tracked use of the sequence of multiple services by the application,
      wherein the application has an associated configured usage model related to use of the sequence of multiple services,
      wherein one or more of the multiple network-accessible services of the sequence each has an associated configured usage model related to use of the service, and
      wherein the determined fees include a first fee that is based at least in part on the configured usage model associated with the application and one or more other fees based at least in part on the configured usage models associated with the one or more services of the sequence.

44. The computing system of claim 43 wherein the associated configured usage model for the application is defined by a provider of the application and includes an indicated price that corresponds to an indicated amount of use of the sequence of multiple services, wherein the providing of the metering service further includes obtaining payment from an end user of the application for the determined first fee and providing compensation to one or more other providers of the one or more services of the sequence based at least in part on the determined one or more other fees, and wherein the use by the application of the sequence of multiple services is performed on behalf of the end user of the application.

45. The computing system of claim 43 wherein the received indication of the use by the application of the sequence of multiple services includes receiving the application key for the use, the application key being an alphanumeric string specific to the application and being received by the metering service from at least one of the application and of one or more of the multiple services of the sequence to enable the metering service to track use of services by each of multiple applications having distinct application keys, and wherein the tracking of the use by the application of the sequence of multiple services is based at least in part on the receiving of the application key for the use.

46. The computing system of claim 43 wherein, after the application invokes the first service, the first service provides a response to the application without invoking a next service in the sequence, the first service being a first service in the sequence such that the services of the sequence other than the first service are not invoked as part of the use, and wherein the system configured to provide the metering service includes software instructions for execution by at least one of the one or more processors of the computing system.

* * * * *

UNITED STATES PATENT AND TRADEMARK OFFICE
CERTIFICATE OF CORRECTION

| | | |
|---|---|---|
| PATENT NO. | : 8,055,586 B1 | Page 1 of 3 |
| APPLICATION NO. | : 11/618486 | |
| DATED | : November 8, 2011 | |
| INVENTOR(S) | : Peter Sirota et al. | |

It is certified that error appears in the above-identified patent and that said Letters Patent is hereby corrected as shown below:

ON THE TITLE PAGE
Item (56):
""NTT Corn to Launch Asia's First UDDI Registry on October 9," October 8, 2002, NTT Communications, retrieved September 9, 2005, from http://www.ntt.com/release_e/news02/0010/1008.html, 3 pages." should read, --"NTT Com to Launch Asia's First UDDI Registry on October 9," October 8, 2002, NTT Communications, retrieved September 9, 2005, from http://www.ntt.com/release_e/news02/0010/1008.html, 3 pages.--.

Item (56):
"Actional™, The Web Services Management Platform: Managing the Impact of Change in an Enterprise Web Services Network – March 2003, retrieved November 7, 2003, from http://www.actional.com/down-loads/products/managing.enterpriseweb.services.network.pdf 26 pages." should read, --Actional™, The Web Services Management Platform: Managing the Impact of Change in an Enterprise Web Services Network – March 2003, retrieved November 7, 2003, from http://www.actional.com/downloads/products/managing.enterpriseweb.services.network.pdf, 26 pages.--.

Item (56):
"Allidex, Frequently Asked Questions, retrieved November 4, 2003, from http://www.allidex.com/faw.html. 4 pages." should read, --Allidex, Frequently Asked Questions, retrieved November 4, 2003, from http://www.allidex.com/faq.html, 4 pages.--.

Item (56):
"Bunting, Doug et al., "Web Services Composite Application Framework (WS-CAF),". July 28, 2003, retrieved from http://www.oasis-open.org/committees/download.php/4343/WS-CAF%20Primer.pdf, 23 pages." should read, --Bunting, Doug et al., "Web Services Composite Application Framework (WS-CAF)," July 28, 2003, retrieved September 12, 2005, from http://www.oasis-open.org/committees/download.php/4343/WS-CAF%20Primer.pdf, 23 pages.--.

<div style="text-align:center">

Signed and Sealed this
Twenty-seventh Day of November, 2012

David J. Kappos
*Director of the United States Patent and Trademark Office*

</div>

CERTIFICATE OF CORRECTION (continued)
U.S. Pat. No. 8,055,586 B1

Item (56):
"Burbeck, S., "The Tao of E-Business Services – The Evolution of Web Applications Into Service-Oriented Components With Web Services," October 2000, IBM®, http://www-4.ibm.com/software/devel-oper/library/was-tao/index.html, 13 pages." should read, --Burbeck, S., "The Tao of E-Business Services – The Evolution of Web Applications Into Service-Oriented Components With Web Services," October 2000, IBM®, http://www-4.ibm.com/software/developer/library/ws-tao/index.html, 13 pages.--.

Item (56):
"Business Wire, "Desktop.com Introduces Devtop, the First Integrated Platform for Building, Deploying, and Distributing Wed-Based Application," June 26, 2000, retrieved September 8, 2005, from http://www.findarticles.com/p/articles/mi_m0EIN/is_2000_June_26/ai_62915951/print, 2 pages." should read, --Business Wire, "Desktop.com Introduces Devtop, the First Integrated Platform for Building, Deploying, and Distributing Web-Based Applications," June 26, 2000, retrieved September 8, 2005, from http://www.findarticles.com/p/articles/mi_m0EIN/is_2000_June_26/ai_62915951/print, 2 pages.--.

Item (56):
"E2OPEN™, The E2open Integration Platform, retrieved November 7, 2003, from http://www.e2open.com/downloads/e2open_integra-tion_platform_datasheet.pdf, 5 pages." should read, --E2OPEN™, The E2open Integration Platform, retrieved November 7, 2003, from http://www.e2open.com/downloads/e2open_integration_platform_datasheet.pdf, 5 pages.--.

Item (56):
"Radding, A., "Generating Revenue from Web Services – Six Vendors With the Right Tools," January 20, 2003, retrieved from http://72.14.207.104/search?q=cache:W5EXBA4Lr54J:home.comcast.net/~alanrad-ding/iaws.pdf+generating+revenue+from+web+services+radding&hl=en&gl=us&ct=c1nk&cd=3, 4 pages." should read, --Radding, A., "Generating Revenue from Web Services – Six Vendors With the Right Tools," January 20, 2003, retrieved from http://72.14.207.104/search?q=cache:W5EXBA4Lr54J:home.comcast.net/~alanradding/iaws.pdf+generating+revenue+from+web+services+radding&hl=en&gl=us&ct=c1nk&cd=3, 4 pages.--.

Item (56):
"Sterling Commerce, Sterling Information Broker, retrieved November 10, 2003, from http://www.sterlingcommerce.com/PDF/Solutions/Ster-ling/SC0040.InfoBrokerOver.6-02.pdf, 4 pages." should read, --Sterling Commerce, Sterling Information Broker, retrieved November 10, 2003, from http://www.sterlingcommerce.com/PDF/Solutions/Sterling/SC0040.InfoBrokerOver.6-02.pdf, 4 pages.--.

CERTIFICATE OF CORRECTION (continued)
U.S. Pat. No. 8,055,586 B1

Item (56):
"Sterling Commerce, Sterling Information Broker, retrieved November 10, 2003, from http://www.sterlingcommerce.com/solutions/em/com-merce/iibs.html, 3 pages." should read, --Sterling Commerce, Sterling Information Broker, retrieved November 10, 2003, from http://www.sterlingcommerce.com/solutions/em/commerce/iibs.html, 3 pages.--.

Item (56):
"StrikeIron, Inc., "StrikeIron Web Servcies Business Network Overview," retrieved September 12, 2005, from http://www.strikeiron.com/doc/StrikeIronWebServicesBusinessNetworkOverview.pdf, 24 pages." should read, --StrikeIron, Inc., "StrikeIron Web Services Business Network Overview," retrieved September 12, 2005, from http://www.strikeiron.com/doc/StrikeIronWebServicesBusinessNetworkOverview.pdf, 24 pages.--.